US008829708B2

(12) United States Patent
Koiso

(10) Patent No.: US 8,829,708 B2
(45) Date of Patent: Sep. 9, 2014

(54) IN-VEHICLE APPARATUS CONTROL SYSTEM, IN-VEHICLE APPARATUS CONTROL METHOD, AND IN-VEHICLE APPARATUS CONTROL PROGRAM

(75) Inventor: Hisashi Koiso, Yokohama (JP)

(73) Assignee: JVC KENWOOD Corporation, Kanagawa-Ken (JP)

( * ) Notice: Subject to any disclaimer, the term of this patent is extended or adjusted under 35 U.S.C. 154(b) by 376 days.

(21) Appl. No.: 13/281,904

(22) Filed: Oct. 26, 2011

(65) Prior Publication Data

US 2012/0104844 A1 May 3, 2012

(30) Foreign Application Priority Data

Oct. 28, 2010 (JP) ................................ 2010-242775

(51) Int. Cl.
*B60L 1/00* (2006.01)
*B60L 3/00* (2006.01)
*H02G 3/00* (2006.01)
*G08G 1/09* (2006.01)

(52) U.S. Cl.
CPC ..................................... *G08G 1/094* (2013.01)
USPC .......................................... 307/9.1; 307/10.1

(58) Field of Classification Search
USPC ............ 307/9.1, 10.1; 701/36, 200, 207, 213
See application file for complete search history.

(56) References Cited

U.S. PATENT DOCUMENTS

| | | | | |
|---|---|---|---|---|
| 6,294,843 | B1 * | 9/2001 | Kato et al. | 290/40 C |
| 6,845,313 | B2 * | 1/2005 | Hasegawa et al. | 701/113 |
| 7,683,767 | B2 * | 3/2010 | Hara et al. | 340/438 |
| 2007/0182248 | A1 * | 8/2007 | Blaker et al. | 307/10.1 |
| 2008/0203975 | A1 * | 8/2008 | Burlak et al. | 320/161 |
| 2008/0298712 | A1 * | 12/2008 | Kang | 382/266 |
| 2009/0299559 | A1 * | 12/2009 | Shimohira et al. | 701/22 |
| 2009/0319179 | A1 * | 12/2009 | Mino | 701/207 |
| 2011/0181106 | A1 * | 7/2011 | Kim | 307/9.1 |

FOREIGN PATENT DOCUMENTS

| | | | |
|---|---|---|---|
| CN | 201231733 | Y | 5/2009 |
| JP | 2009-116480 | | 5/2009 |

* cited by examiner

*Primary Examiner* — Rexford Barnie
*Assistant Examiner* — Rasem Mourad
(74) *Attorney, Agent, or Firm* — Renner, Kenner, Greive, Bobak, Taylor & Weber

(57) ABSTRACT

An in-vehicle apparatus control system controls an in-vehicle apparatus installed in a vehicle. Voltage-change pattern data that indicates change in voltage level is stored as associated with elapse of time, the voltage levels being detected for each of a plurality of periods decided based on an operating condition of an engine of the vehicle. Voltage levels of a battery installed in the vehicle are detected for the respective periods. It is determined whether the detected voltage levels match the stored voltage-change pattern data. The in-vehicle apparatus is controlled to operate in normal operation only if it is determined that the detected voltage levels match the stored voltage-change pattern data.

14 Claims, 19 Drawing Sheets

| ENGINE SPEED R [r/min] | VOLTAGE CHANGE PATTERN |
|---|---|
| 0<R<1000 | ... |
| 1000≦R<2000 | ... |
| 2000≦R<3000 | ... |
| ... | ... |

IN-VEHICLE APPARATUS CONTROL SYSTEM, IN-VEHICLE APPARATUS CONTROL METHOD, AND IN-VEHICLE APPARATUS CONTROL PROGRAM

CROSS-REFERENCE TO RELATED APPLICATIONS

This application is based on and claims the benefit of priority from the prior Japanese Patent Application No. 2010-242775 filed on Oct. 28, 2010, the entire content of which is incorporated herein by reference.

BACKGROUND OF THE INVENTION

The present invention relates to an in-vehicle apparatus control system, an in-vehicle apparatus control method, and an in-vehicle apparatus control program.

Vehicles are equipped with various apparatuses, such as audio equipment, an automotive navigation system, and an electronic toll collection (ETC) system. These apparatuses are referred to as an in-vehicle apparatus, hereinafter.

In-vehicle apparatuses are easily detached from a vehicle by a user. Therefore, there is a risk that someone steals an in-vehicle apparatus for impermissible or unauthorized use. Moreover, in the case of an in-vehicle apparatus, such as an ETC system, that is used for a vehicle registered in advance with a specific institution, there is a risk that a user installs the in-vehicle apparatus in anther vehicle with no permission for unauthorized use.

Accordingly, there are a variety of proposals for detection of unauthorized installation of an in-vehicle apparatus. In a known technique, a monitor recognizes a vehicle registration plate, vehicle-type information, etc. through an image pictured by a camera. A server receives a result of recognition over a network to detect an in-vehicle apparatus installed with no authorization. Then, the monitor receives a result of detection over the network to warn a user of unauthorized installation.

However, in the known technique explained above, image recognition and data communications take time and hence it is difficult to quickly detect unauthorized installation of an in-vehicle apparatus before unauthorized use. Furthermore, the known technique is disadvantageous in the accuracy of detection of unauthorized installation of an in-vehicle apparatus, depending on how or where a vehicle registration plate is attached, in what surrounding environment, the registration plate is pictured by a camera.

SUMMARY OF THE INVENTION

A purpose of the present invention is to provide an in-vehicle apparatus control system, an in-vehicle apparatus control method, and an in-vehicle apparatus control program that can detect impermissible or unauthorized installation of an in-vehicle apparatus to prevent impermissible or unauthorized use of the in-vehicle apparatus with smaller adverse effects from the environment around a vehicle.

The present invention provides an in-vehicle apparatus control system for controlling an in-vehicle apparatus installed in a vehicle comprising: a storage unit configured to store voltage-change pattern data that indicates change in voltage level, as associated with elapse of time, the voltage levels being detected for each of a plurality of periods decided based on an operating condition of an engine of the vehicle; a voltage detection unit configured to detect voltage levels of a battery installed in the vehicle for the respective periods; a determination unit configured to determine whether the detected voltage levels match the stored voltage-change pattern data; and a control unit configured to control the in-vehicle apparatus to operate in normal operation only if it is determined that the detected voltage levels match the stored voltage-change pattern data.

Moreover, the present invention provides an in-vehicle apparatus control method for controlling an in-vehicle apparatus installed in a vehicle comprising the steps of: storing voltage-change pattern data that indicates change in voltage level, as associated with elapse of time, the voltage levels being detected for each of a plurality of periods decided based on an operating condition of an engine of the vehicle; detecting voltage levels of a battery installed in the vehicle for the respective periods; determining whether the detected voltage levels match the stored voltage-change pattern data; and controlling the in-vehicle apparatus to operate in normal operation only if it is determined that the detected voltage levels match the stored voltage-change pattern data.

Furthermore, the present invention provides an in-vehicle apparatus control program stored in a non-transitory computer readable device, for controlling an in-vehicle apparatus installed in a vehicle comprising: a program code of storing voltage-change pattern data that indicates change in voltage level, as associated with elapse of time, the voltage levels being detected for each of a plurality of periods decided based on an operating condition of an engine of the vehicle; a program code of detecting voltage levels of a battery installed in the vehicle for the respective periods; a program code of determining whether the detected voltage levels match the stored voltage-change pattern data; and a program code of controlling the in-vehicle apparatus to operate in normal operation only if it is determined that the detected voltage levels match the stored voltage-change pattern data.

DETAILED DESCRIPTION OF PREFERRED EMBODIMENTS

Embodiments of the present invention will be explained with reference to the attached drawings.

(First Embodiment)

In this present invention, various types of apparatus installed in a vehicle, such as an automotive navigation system, an ETC (Electronic Toll Collection) system, and an audio system are referred to as an in-vehicle apparatus as a generic name. Explained hereinafter is an in-vehicle apparatus control system integral with an automotive navigation system.

Figure 1:
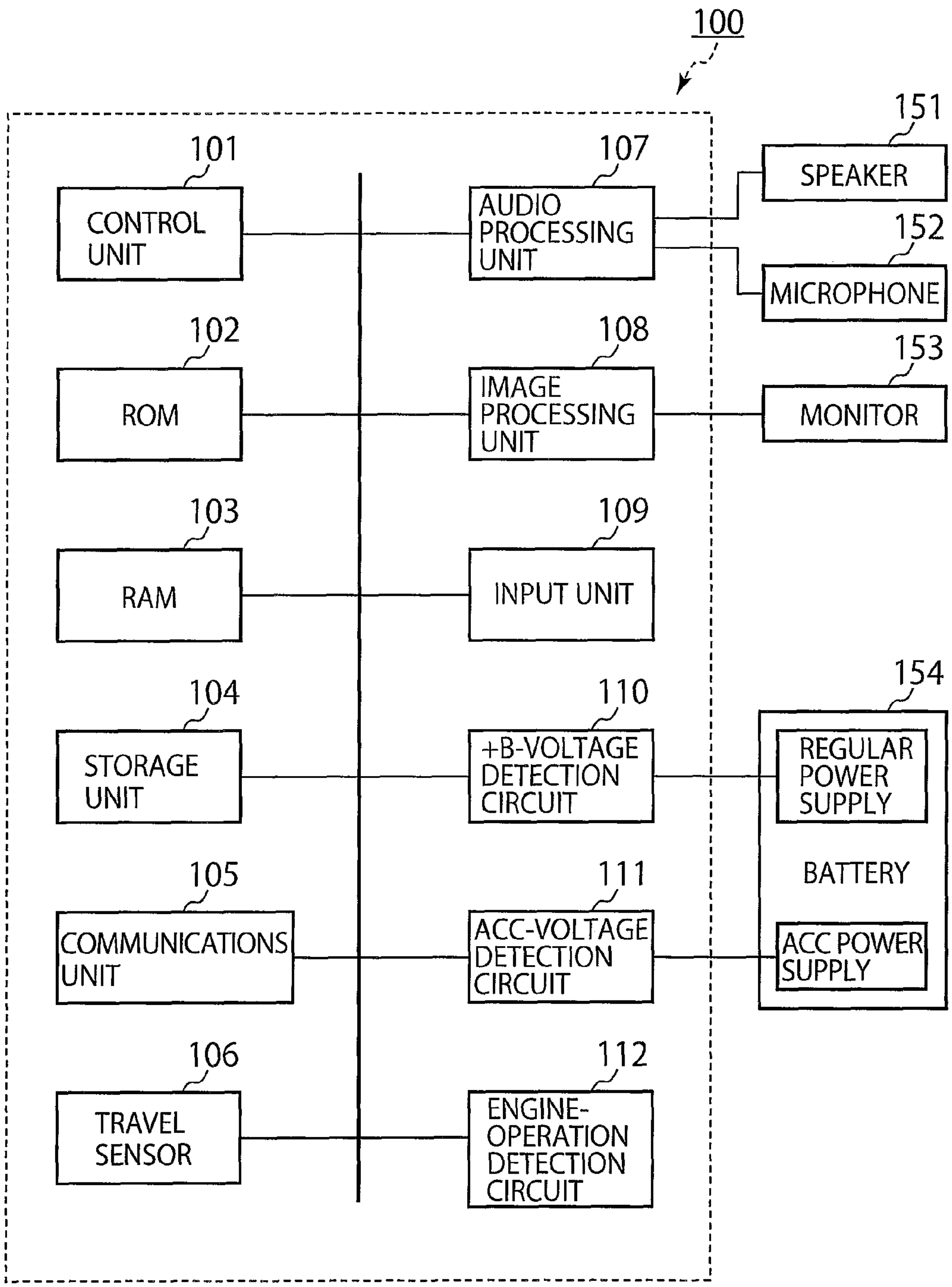
FIG. 1 is a view showing a hardware configuration of an in-vehicle apparatus control system in a first embodiment according to the present invention.

FIG. 1 is a view showing a hardware configuration of an in-vehicle apparatus control system 100 in this embodiment. The in-vehicle apparatus control system 100 is provided with a control unit 101, a ROM (Read Only Memory) 102, a RAM (Random Access Memory) 103, a storage unit 104, a communications unit 105, a travel sensor 106, an audio processing unit 107, an image processing unit 108, an input unit 109, a +B (regular power supply)-voltage detection circuit 110, an ACC (accessory)-voltage detection circuit 111, and an engine-operation detection circuit 112.

The control unit 101 is configured with an ECU (Electronic Control Unit) or a CPU (Central Processing Unit). The control unit 101 retrieves a program pre-stored in a ROM 102 and runs the program for entire control of the in-vehicle apparatus control system 100.

The control unit 101 employs an ALU (Arithmetic Logic Unit) to a register that is a storage area accessible at a high speed, for performing an arithmetic operation such as: addition, subtraction, multiplication and division; a logical operation such as logical disjunction, logical conjunction and logical negation; and a bit operation such as logical OR, logical AND, bit inversion, bit shift and bit rotation.

The ROM 102 is a non-volatile memory for pre-storing an operating system (OS), programs, other data, etc. The RAM 103 temporarily store data, programs, etc. such as those retrieved from the storage unit 104.

The control unit 101 performs various processes, such as, controlling the ALU to directly work for values stored in a variable area of the RAM 103 to perform operations, moving once data stored in the RAM 103 to a register for operation to the register, and restoration of a result of operation to the RAM 103.

Although the control unit 101 performs several steps shown in FIGS. 3 and 5 which will be described later, a determination unit (not shown) provided separately from the control unit 101 can perform several determination steps shown in FIGS. 3 and 5. The determination unit can also perform the exclusion of a specific period from a voltage-change pattern identification process which will be described later, instead of the control unit 101.

Moreover, although not shown, an acquisition unit (not shown) provided separately from the control unit 101 can perform the following steps, which will be described later, instead of the control unit 101:

acquiring the minimum and maximum threshold levels by using detected voltage levels; and acquiring the maximum threshold level by adding a specific level to a maximum level of the detected voltage levels and acquiring the minimum threshold level by subtracting a specific level from a minimum level of the detected voltage levels.

Furthermore, although not shown, an updating unit (not shown) provided separately from the control unit 101 can perform the following steps, which will be described later, instead of the control unit 101:

updating stored voltage-change pattern data by using minimum and maximum threshold levels; and updating stored voltage-change pattern data if a current day and time elapses from stored day and time for a specific term or more.

The storage unit 104 is equipped with a hard disc drive or a flash memory for storing specific map information, various setting information, etc. The control unit 101 may retrieve, at any time, map information stored in a DVD-ROM or the like and store it in the RAM 103. Or the control unit 101 may retrieve, in advance, map information from a storage medium and store (install) it in the storage unit 104.

The communications unit 105 is equipped with a GPS (Global Positioning System) module. The GPS module receives GPS waves from a plurality of GPS satellites and inputs a result of reception to the control unit 101. The control unit 101 controls the GPS module to acquire the current location of the in-vehicle apparatus control system 100. The communications unit 105 may also be equipped with a NIC (Network Interface Card) or the like for connecting to a communication network such as the Internet.

The travel sensor 106 is equipped with a speed sensor, an accelerometer, a gyrosensor, etc. for measuring a travel speed, a travel direction, etc. of a vehicle equipped with the in-vehicle apparatus control system 100.

The audio processing unit 107 converts audio data retrieved from the storage unit 104 into an analog audio signal and outputs it to a speaker 151 for giving off sounds. The control unit 101 can control the audio processing unit 107 to reproduce any audio data and output it to the speaker 151 for giving off reproduced sounds. The audio processing unit 107 converts sounds picked up by a microphone 152 into a digital audio signal and inputs it to the control unit 101. The control unit 101 can control the audio processing unit 107 to receive the sounds picked up by the microphone 152 for speech recognition using the acquired audio data.

The image processing unit 108 processes image data retrieved from the storage unit 104, through an image operation processor (not shown), and stores the processed image data to a frame memory. The image operation processor is installed in the control unit 101 or the image processing unit 108. The frame memory is installed in the image processing unit 108. The image data stored in the frame memory is converted into a video signal at a specific synchronous timing and output to a monitor 153 connected to the image processing unit 108.

The input unit 109 equipped with a power button, a cursor button, etc. accepts an instruction from a user when he or she depresses any button. The control unit 101 sets a destination or the like based on an instruction accepted via the input unit 109. The input unit 109 may be equipped with a touch sensor that is stuck on the monitor 153, to detect a user touch operation for receiving a user instruction.

The +B-voltage detection circuit 110 is connected to a battery 154, to measure a voltage level of a power supplied from a regular power supply. The ACC-voltage detection circuit 111 is also connected to the battery 154, to measure a voltage level of a power supplied from an accessory power supply. A voltage level measured by the +B-voltage detection circuit 110 or the ACC-voltage detection circuit 111 is input to the control unit 101.

The engine-operation detection circuit 112 detects the rotation of a motor (a cell motor) for starting an engine, the start of the engine, the rotation of the engine, and the stop of the engine. A result of detection is input to the control unit 101.

Figure 2:
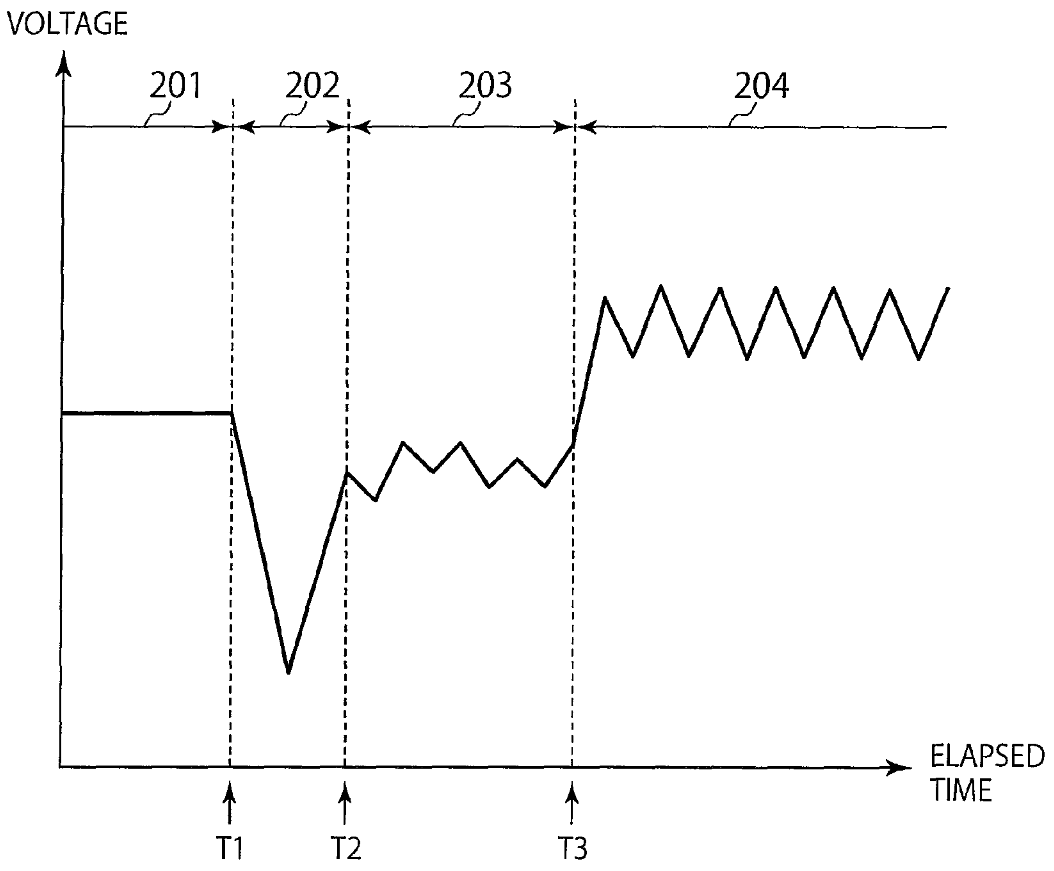
FIG. 2 is a view showing a pattern of detected voltage levels.

Explained next with reference to FIG. 2 is a voltage change pattern detected by the +B-voltage detection circuit 110 or the ACC-voltage detection circuit 111. The abscissa and ordinate in FIG. 2 indicate an elapsed time and a detected voltage level, respectively. A voltage level detected by the +B-voltage detection circuit 110 is treated in this embodiment. Nevertheless, the control unit 101 may use a voltage level detected by the +B-voltage detection circuit 110 for a first period 201 and voltage levels detected by the ACC-voltage detection circuit 111 for a second period 202, a third period 203, and a fourth period 204, in FIG. 2.

FIG. 2 shows a continuous change in voltage level with no interruption for easier understanding of the present invention. However, the change in voltage level may be indicated with a plurality of points that represent a voltage level. In other words, the +B-voltage detection circuit 110 or the ACC-voltage detection circuit 111 may detect a voltage level at a noncontinuous timing. In detail, the +B-voltage detection circuit 110 or the ACC-voltage detection circuit 111 may detect a voltage level at a specific interval of VSYNC (a vertical synchronization interruption), for example. Or the control unit 101 may employ a timer function or the like for detection of a voltage level through the +B-voltage detection circuit 110 or the ACC-voltage detection circuit 111, at a desired time.

The first to fourth periods 201 to 204 in FIG. 2 are defined as follows in this embodiment.

The first period 201 is a period for which an engine is not operating with a smaller load to a power supply, hence showing a constant detected voltage level.

The second period 202 is a period for which a user inserts an ignition key into an ignition cylinder and turns the key so that a cell motor starts to rotate to start an engine, with a heavier load to a power supply, hence showing a steep voltage drop. A voltage drop (a voltage change pattern) in the second period 202 depends on the discharge characteristics of a power supply, the type of an engine, the displacement of an engine, the number of cylinders of an engine, the torque of a cell motor, the mechanism of transferring the power of a cell motor to an en engine, etc.

The third period 203 is a period for which a cell motor is rotating. A voltage change pattern in the third period 203 depends on the type of an engine, a power supply, a cell motor, etc. or their combination.

The fourth period 204 is a period for which an engine is rotating and hence an alternator is rotating, with a slight increase in a detected voltage level due to power generation. A voltage change pattern in the fourth period 204 depends on the engine speed, the characteristics of an alternator, etc.

As explained above, the voltage change pattern to be detected for each of the four periods depends on the type of an engine, a power supply, a cell motor, an alternator or their combination. This means that the voltage change pattern depends on vehicles, or is unique to each vehicle.

FIG. 2 shows a time T1, a time T2 and a time T3. The time T1 is a moment at which an ignition key is inserted into an ignition cylinder and turned (or at which an ignition button is depressed.) The time T2 is a moment at which a cell motor starts to rotate. The time T3 is a moment at which an engine starts to rotate. The times T1 to T3 are determined by the engine-operation detection circuit 112.

Explained next are various processes performed by the components of the in-vehicle apparatus control system 100. The in-vehicle apparatus control system 100 determines whether an in-vehicle apparatus has been installed in an impermissible or unauthorized place, based on a voltage level detected by the +B-voltage detection circuit 110. Nevertheless, the in-vehicle apparatus control system 100 may perform various processes described below, based on a voltage level detected by the ACC-voltage detection circuit 111.

In the following processes described below, the +B-voltage detection circuit 110 repeatedly detects a voltage level at a specific timing (for example, a 100-millsec interval), temporarily stores a result of detection performed for a specific number of times just before the current timing into the RAM 103, and then updates the stored data at a given timing.

(Voltage-Change Pattern Acquisition Process)

Figure 3:
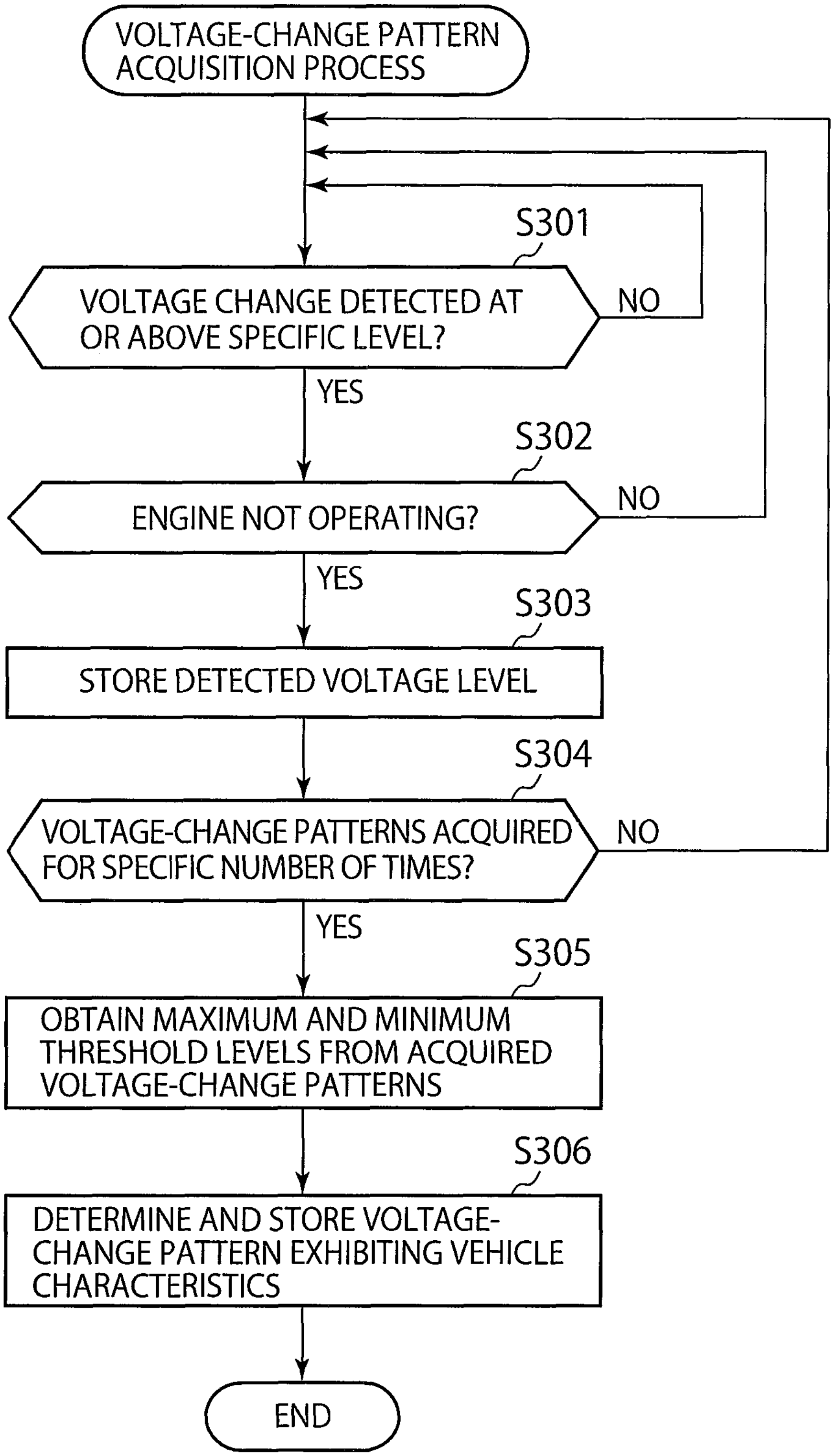
FIG. 3 is a flowchart of a voltage-change pattern acquisition process.

FIG. 3 is a flowchart of a process for acquiring a voltage change pattern.

Firstly, the control unit 101 determines whether a voltage change at or above a specific level is detected by the +B-voltage detection circuit 110 (step S301). The specific level is defined as: high enough to ignore the noises expected to be generated when the +B-voltage detection circuit 110 detects a voltage level; but lower than a level of change occurred when an ignition key is inserted into an ignition cylinder and turned.

If it is determined that a voltage change at or above the specific level is not detected (No in step S301), the control unit 101 repeats the step in step S301 and stays in an waiting mode until there is a voltage change at or above the specific level, or until an ignition key is inserted into an ignition cylinder and turned.

If it is determined that a voltage change at or above the specific level is detected (Yes in step S301), the control unit 101 determines in step S302 whether an engine was not operating (engine stop) before the detection in step S301.

If the engine was in a condition except for engine stop (No in step S302), the control unit 101 returns to step S301. On the other hand, if the engine was not operating (Yes in step S302), the control unit 101 stores a detected voltage level in the storage unit 104 (step S303). In detail, the control unit 101 starts to store a detected voltage level into the storage unit 104 when there is a change from a state of engine stop to another state in which an ignition key is inserted into an ignition cylinder and turned.

A voltage level is repeatedly detected at a specific timing. Therefore, a voltage change from the time T1 (at which an ignition key is inserted into an ignition cylinder and turned) to the time T3 (at which an engine starts to rotate) and up to the elapse of a specific time (for example, 2 seconds) is stored in the storage unit 104. The duration for storing a detected voltage level in the storage unit 104 by the control unit 101 is set to any period. Stored in the storage unit 104 in this case is one data that indicates a voltage change over time for each start of an engine.

Next, the control unit 101 determines whether the number of data indicating a voltage change over time and stored in the storage unit 104 has reached a specific number (step S304). The specific number is, for example 3, but can be set to any number.

If the number of data has not reached the specific number (No in step S304), the control unit 101 repeats the steps from S301 to S304 until the number of data reaches the specific number.

On the other hand, if the number of data has reached the specific number (Yes in step S304), the control unit 101 obtains the maximum and minimum threshold levels from acquired specific number of voltage-change patterns (step S305). The maximum and minimum levels are used in a voltage-change pattern identification process which will be described later.

The maximum and minimum threshold levels are defined as the upper and lower limits, respectively, between which a voltage change pattern matches the characteristics of a vehicle to determine that an in-vehicle apparatus has been installed in the right vehicle, in the voltage-change pattern identification process.

The right vehicle is defined as a vehicle in which an in-vehicle apparatus has been installed (with authorization by a specific institution in the case of an ETC system or the like) and must not be installed in another vehicle with no permission or authorization.

In the present embodiment, a maximum threshold level (the upper limit) is set to the level obtained by adding 50 millvolts to the maximum level of acquired specific number of voltage change patterns, in the control unit 101.

Moreover, in the present embodiment, a minimum threshold level (the lower limit) is set to the level obtained by subtracting 50 millvolts from the minimum level of acquired specific number of voltage change patterns, in the control unit 101.

Not only that, the maximum and minimum threshold levels may be set to the levels obtained by adding and subtracting 50 millvolts to and from the average level of acquired specific number of voltage change patterns, respectively. Moreover, a statistical level, such as a median, can be used instead of the average level.

Figure 4:
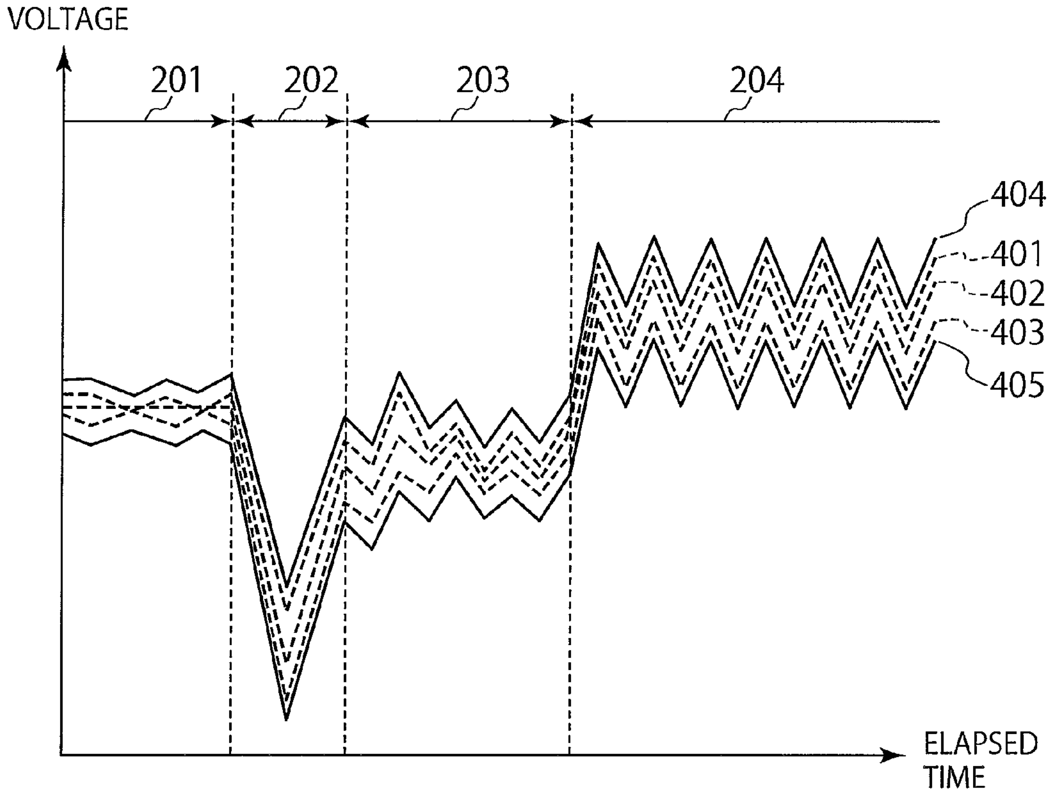
FIG. 4 is a view showing an example of acquired voltage-change patterns.

FIG. 4 shows an example of obtained maximum and minimum threshold levels. Shown in this example are three voltage change patterns 401, 402 and 403. A line 404 indicates a maximum threshold-level pattern that connects the maximum levels of voltage change patterns over the first to fourth periods 201 to 204. A line 405 indicates a minimum threshold-level pattern that connects the minimum levels of the voltage change patterns over the first to fourth periods 201 to 204.

Using the maximum and minimum threshold-level pattern lines 404 and 405, the control unit 101 determines a voltage change pattern that matches the characteristics of the vehicle (the right vehicle) in which an in-vehicle apparatus has been installed and monitored by the in-vehicle apparatus control system 100, and stores the determined pattern in the storage unit 104 (step S306 in FIG. 3). For example, the maximum and minimum threshold-level pattern lines 404 and 405 shown in FIG. 4 are combined to generate a voltage change pattern unique to the vehicle in which an in-vehicle apparatus has been installed. The generated voltage change pattern is stored in the storage unit 104 (step S306). It is then determined that an in-vehicle apparatus has been installed in the right vehicle if a detected voltage change pattern matches the pattern stored in S306.

(Voltage-Change Pattern Identification Process)

Figure 5:
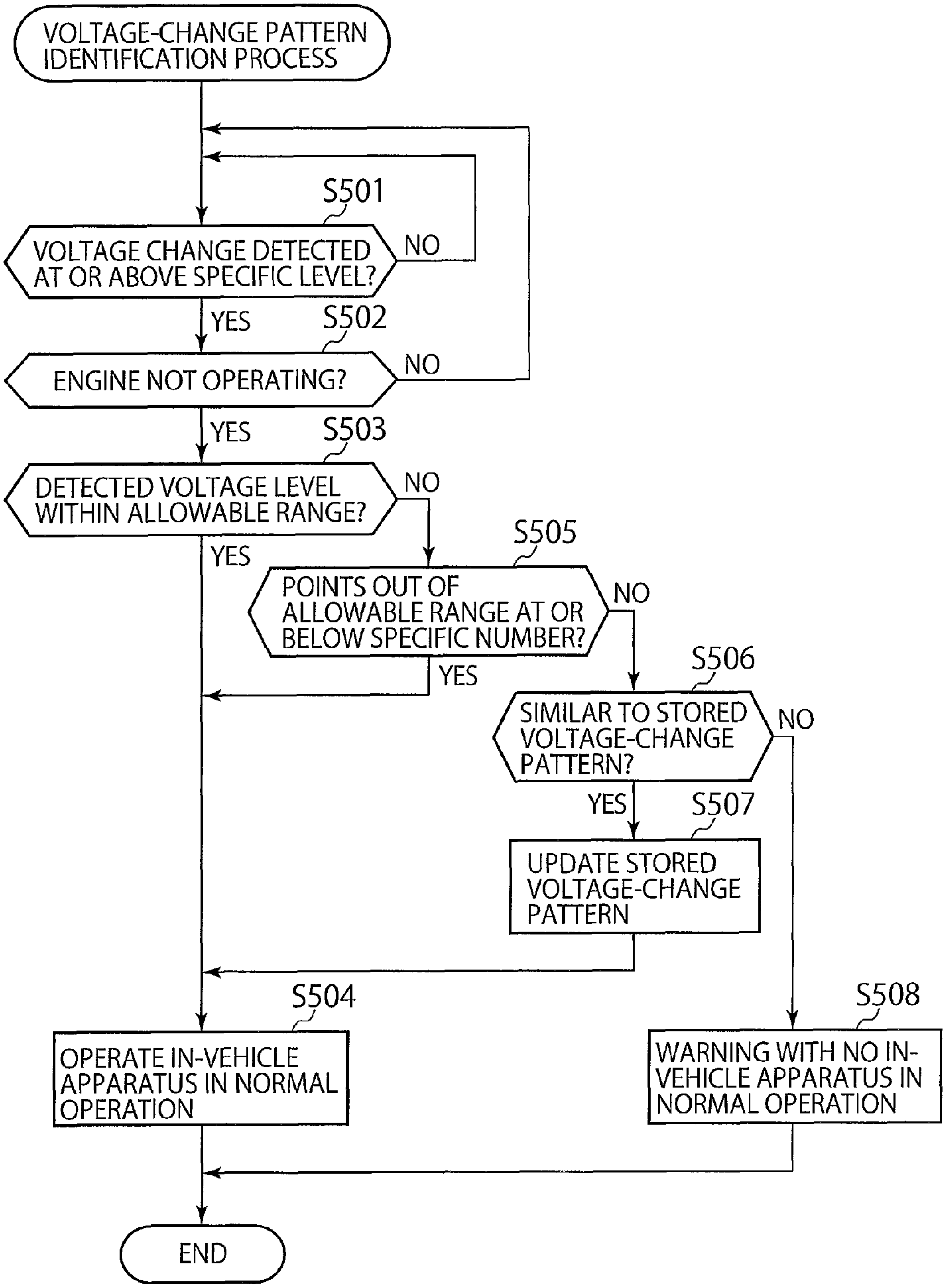
FIG. 5 is a flowchart of a voltage-change pattern identification process.

FIG. 5 is a flowchart of a voltage-change pattern identification process to determine whether a detected voltage level matches the voltage change pattern acquired through the voltage-change pattern acquisition process, so as to determine whether an in-vehicle apparatus has been installed in the right vehicle.

Firstly, the control unit 101 determines whether a voltage change at or above a specific level is detected by the +B-voltage detection circuit 110 (step S501). The specific level is defined as: high enough to ignore the noises expected to be generated when the +B-voltage detection circuit 110 detects a voltage level; but lower than a level of change occurred when an ignition key is inserted into an ignition cylinder and turned.

If it is determined that a voltage change at or above the specific level is not detected (No in step S501), the control unit 101 repeats S501 and stays in an waiting mode until there is a voltage change at or above the specific level.

If it is determined that a voltage change at or above the specific level is detected (Yes in step S501), the control unit 101 determines in step S502 whether an engine was not operating (engine stop) before the detection in step S501.

If the engine was in a condition except for engine stop (No in step S502), the control unit 101 returns to step S501. On the other hand, if the engine was not operating (Yes in step S502), the control unit 101 temporarily stores a record of detected voltage levels in the RAM 103. Then, the control unit 101 determines whether the pattern of change in the detected and temporarily stored record of voltage levels matches the voltage change pattern stored in the storage unit 104 (step S503). In detail, the control unit 101 determines whether the detected voltage levels are equal to or above the minimum threshold-level pattern line 405 but equal to or below the maximum threshold-level pattern line 404 (shown in FIG. 4) stored in the storage unit 104. The range from the lines 405 to 404 is referred to as an allowable range, hereinafter.

In step S503, the control unit 101 determines that the pattern of change in the detected and temporarily stored record of voltage levels is within the allowable range if all of the voltage levels are equal to or above the minimum threshold level but equal to or below the maximum threshold level in each of the periods 201 to 204. If it is determined that the detected voltage levels are within the allowable range (Yes in step S503), the control unit 101 operates an in-vehicle apparatus in normal operation (step S504).

It is defined in the following description that "operate an in-vehicle apparatus in normal operation" means "navigate as requested by a user" and "do not operate an in-vehicle apparatus in normal operation" means "do not navigate even if there is a request by a user", when the in-vehicle apparatus is an automotive navigation system. Moreover, it is defined in the following description that "operate an in-vehicle apparatus in normal operation" means "perform an electric toll collection process (settlement)" and "do not operate an in-vehicle apparatus in normal operation" means "do not perform an electric toll collection process (no settlement)", when the in-vehicle apparatus is an ETC system.

Figure 6:
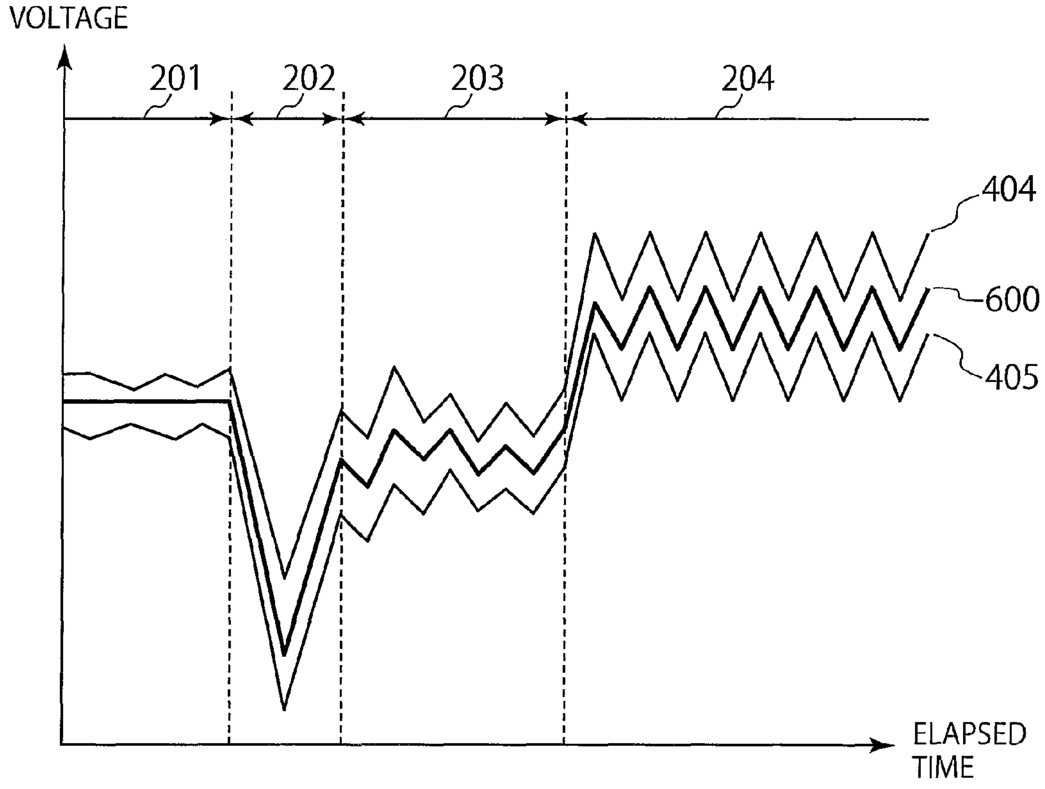
FIG. 6 is a view showing an example of the change in voltage level when operating an in-vehicle apparatus in normal operation.

FIG. 6 shows an example of the change in voltage level within the allowable range. In FIG. 6, a line 600 that indicates detected voltage levels is within the allowable range from the minimum to the maximum threshold-level pattern line 405 to 404. In this case (Yes in step S503 in FIG. 5), it is determined that an in-vehicle apparatus has been installed in the right vehicle, and hence a user can use the in-vehicle apparatus in a normal condition (step S504).

On the other hand, if it is determined that there are detected voltage levels that are out of the allowable range (No in step S503), the control unit 101 determines whether the number of detected points at which voltage levels are out of the allowable range is equal to or smaller than a specific number (step S505). In this embodiment, the specific number is set to 3. If the number of detected points that are out of the allowable range is equal to or smaller than 3, they are treated as singular points and ignored. On the other hand, if the number of detected points that are out of the allowable range is larger than 3, a result of detection is determined as out of the allowable range. The specific number may be set to any value besides 3.

If it is determined that the number of detected points that are out of the allowable range is equal to or smaller than the specific value (Yes in step S505), the control unit 101 operates the in-vehicle apparatus in normal operation (step S504).

Figure 7:
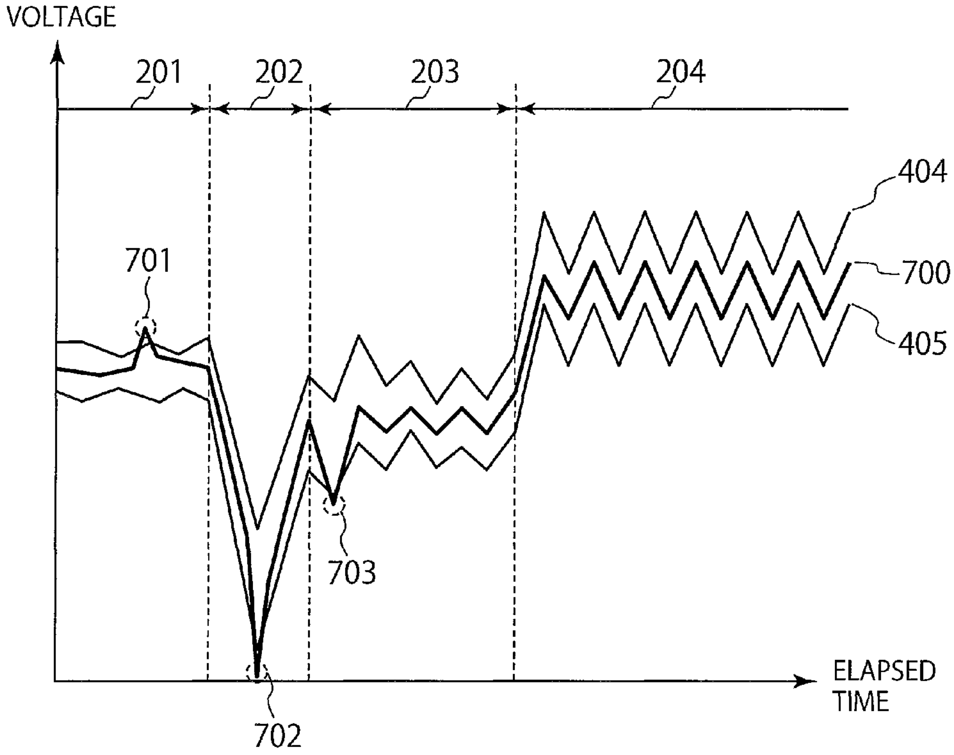
FIG. 7 is a view showing another example of the change in voltage level when operating an in-vehicle apparatus in normal operation.

FIG. 7 shows an example of the change in voltage level where the number of detected points out of the allowable range is equal to or smaller than 3, although not all of the detected points are within the allowable range. On a line 700 that indicates detected voltage levels in FIG. 7, detected points 701, 702 and 703 are out of the allowable range in the first period 201, the second period 202 and the third period 203, respectively. Since, there are only three detected points that are out of the allowable range, it is determined that an in-vehicle apparatus has been installed in the right vehicle, and hence a user can use the in-vehicle apparatus in normal operation.

On the other hand, if it is determined that the number of detected points that are out of the allowable range is larger than the specific value (No in step S505), the control unit 101 determines whether the change in detected voltage levels is similar to the voltage change pattern stored in the storage unit 104 (step S506).

In step S506, the control unit 101 determines that the change in detected voltage levels is similar to the voltage change pattern stored in the storage unit 104 if the pattern of detected points at which voltage levels are out of the allowable range exhibits specific regularity.

Figure 8:
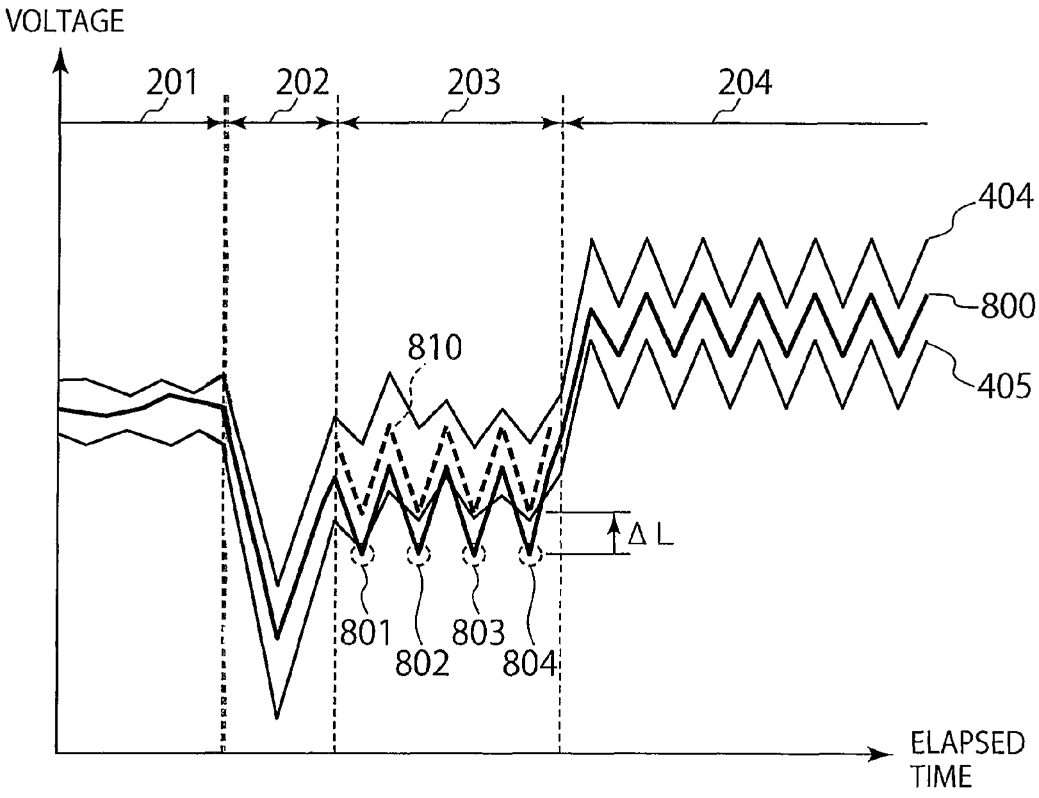
FIG. 8 is a view showing still another example of the change in voltage level when operating an in-vehicle apparatus in normal operation.

FIG. 8 shows an example of the change in voltage level where there is such regularity mentioned above, although there are more than three detected points at which voltage levels are out of the allowable range. On a line 800 that indicates detected voltage levels in FIG. 8, detected points 801, 802, 803 and 804 are out of the allowable range in the period 203. There are more than three detected points at which voltage levels are out of the allowable range. However, the detected points 801, 802, 803 and 804 are out of the allowable range towards the minimum threshold-level side almost in the same degree. It is understood that if the line 800 is shifted by ΔL towards the maximum threshold-level side in the third period 203, it comes to within the allowable range. The control unit 101 determines that the detected points 801, 802, 803 and 804 must have been out of the allowable range due to the degradation of a battery, the change in temperature, etc. And, then the control unit 101 determines that the change in voltage level is similar to the voltage change pattern stored in the storage unit 104. It can be said that, if the voltage change pattern stored in the storage unit 104 is shifted in parallel displacement, and when the difference between the shifted pattern and a pattern of a result of detection is small (or their similarity is large), it is determined that both patterns are similar to each other.

Described with reference to FIG. 8 is the method of determination of similarity in the case where the detected points 801, 802, 803 and 804 are out of the allowable range towards the minimum threshold-level side (the lower side of the graph). Not only that the method of determination of similarity can be applied to the case where the detected points 801, 802, 803 and 804 are out of the allowable range towards the maximum threshold-level side (the upper side of the graph). Moreover, although described with reference to FIG. 8 is the method of determination of similarity in the third period 203, the method can be applied to the first, second and fourth periods 201, 202 and 204.

If it is determined that the change in detected voltage levels is similar to the voltage change pattern stored in the storage unit 104 (Yes in step S506 in FIG. 5), the control unit 101 updates the voltage change pattern stored in the storage unit 104 so that the currently detected voltage levels come to within the allowable range (step S507).

Figure 9:
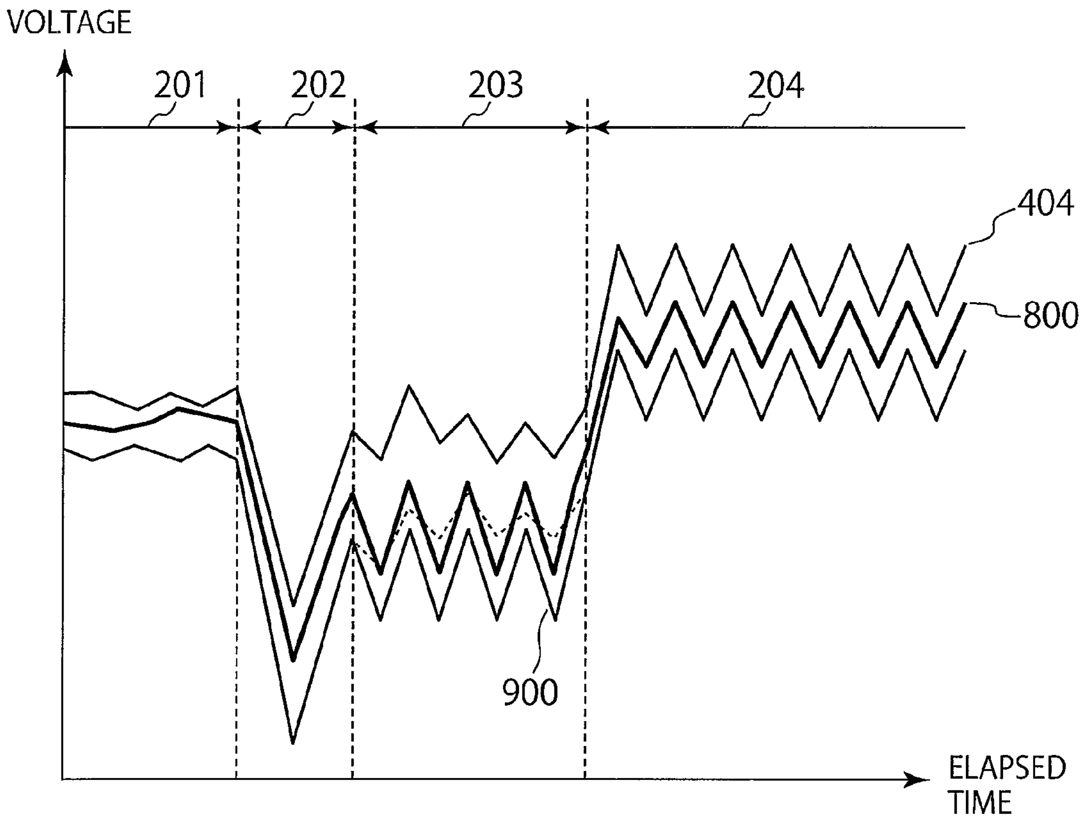
FIG. 9 is a view showing a corrected voltage-change pattern.

Step S507 is performed such that, as shown in FIG. 9, the control unit 101 generates a line 900 as the latest minimum threshold-level pattern by subtracting a specific level (50 millivolts in the embodiment) from the voltage levels currently detected. Then, the control unit 101 operates an in-vehicle apparatus in normal operation (step S504).

As described above, the voltage change pattern stored in the storage unit 104 is corrected or updated and then the corrected pattern is used for the next voltage-change pattern identification process. Through the process described above, a user can use an in-vehicle apparatus in normal operation.

On the other hand, if it is determined that the change in detected voltage levels is not similar to the voltage change pattern stored in the storage unit 104 (No in step S506), the control unit 101 does not operate an in-vehicle apparatus in normal operation and warns a user that the in-vehicle apparatus has not been installed in a permissible manner or in the right vehicle (step S508). Then, the user cannot use the in-vehicle apparatus.

The method of warning is not limited to any particular way in the present invention. The control unit 101 may display a message of impermissible or unauthorized installation of an in-vehicle apparatus on the monitor 153 or give off a warning sound via the speaker 151.

Figure 10:
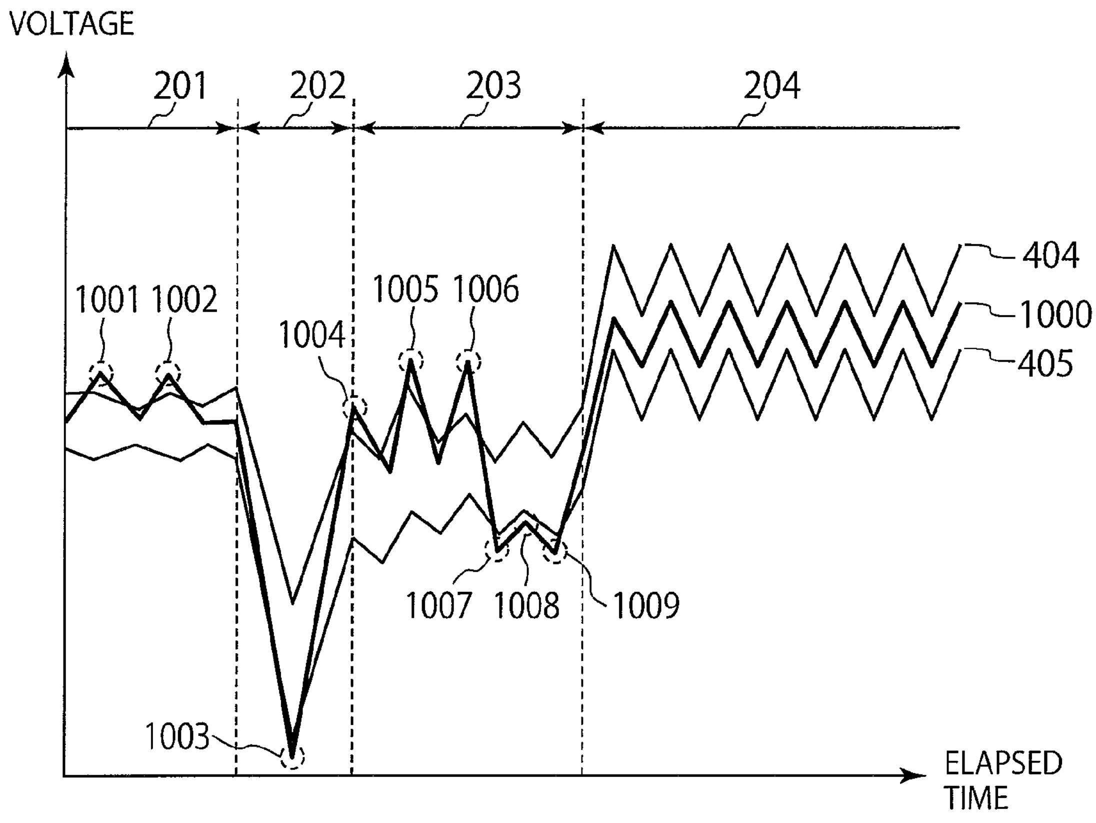
FIG. 10 is a view showing an example of the change in voltage level when not operating an in-vehicle apparatus in normal operation.

FIG. 10 shows an example of the change in voltage level in the case where it is determined that an in-vehicle apparatus has not been installed in a permissible manner or in the right vehicle. In FIG. 10, voltage levels are out of the allowable range at nine detected points 1001 to 1009. For example, in the third period 203, the detected points 1004 to 1006 go above the maximum threshold level and the detected points 1007 to 1009 go below the minimum threshold level, with no regularity in deviation of the voltage levels. In this case, the control unit 101 determines that the change in voltage level in FIG. 10 does not match nor is similar to the voltage change pattern stored in the storage unit 104. It is assumed that an in-vehicle apparatus is now installed in an environment that is different from where the voltage change pattern has been stored in the storage unit 104. Then, the control unit 101 does not operate an in-vehicle apparatus in normal operation and issues a warning to a user.

There may a case where an in-vehicle apparatus, such as an ETC system (that is not allowed to be installed in another vehicle without authorization) has been installed in another vehicle without permission. However, each vehicle exhibits a voltage change pattern having levels and a pattern shape unique to each vehicle. Therefore, it can be assumed that such an in-vehicle apparatus has been installed in another vehicle without permission and hence the use of an in-vehicle apparatus with no authorization can be prevented, according to the present embodiment.

Moreover, the in-vehicle apparatus control system 100 of the present embodiment can quickly detect the removable of an in-vehicle apparatus from the right vehicle and the installation of the in-vehicle apparatus into another vehicle with no permission or authorization, with no need to have communications with a remote server over a communication network. The in-vehicle apparatus control system 100 can be assembled at a relatively low cost because it does not require a network system (except for the communications unit 105 with a GPS module), a camera, etc. Moreover, the in-vehicle apparatus control system 100 can minimize adverse effects of a surrounding environment to the result of voltage detection. Therefore, according to the present embodiment, the removable and installation of an in-vehicle apparatus from the right vehicle to another vehicle with no permission or authorization can be detected and prevented, with less adverse effects of a surrounding environment to the result of voltage detection (Second Embodiment)

In the first embodiment, the acquisition and identification of a voltage change pattern are performed for all periods from the insertion of an ignition key into an ignition cylinder and turning it to the engine start. Different from that, in the second embodiment, the acquisition and identification of a voltage change pattern are performed for each period.

As shown in FIG. 2, the term for detecting a voltage change pattern is divided into the following four periods:

(1) the first period 201 . . . an engine is not operating (engine stop);

(2) the second period 202 . . . a user inserts an ignition key into an ignition cylinder and turns it to start a cell motor to rotate for the start of an engine;

(3) the third period 203 . . . a cell motor is rotating; and (4) the fourth period 204 . . . an engine is rotating.

Described below is a voltage-change pattern acquisition process in each of the first to fourth periods 201 to 204.

(Voltage-Change Pattern Acquisition in First Period)

Figure 11:
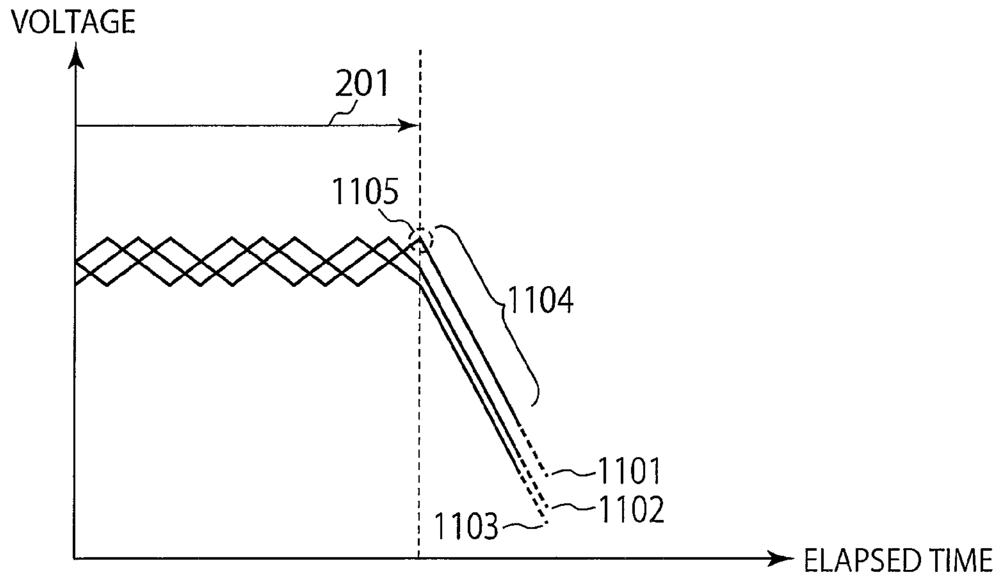
FIG. 11 is a view showing an example of signals that indicate the change in voltage level detected in a first period, in a second embodiment according to the present invention.

FIG. 11 shows a typical example of the change in voltage level in the first period 201. Shown in FIG. 11 are signals 1101, 1102 and 1103 that indicate results of detection of voltage levels for three times.

In this embodiment, the voltage-change pattern acquisition process described with reference to FIG. 3 is performed three times to obtain the maximum and minimum threshold levels to acquire a voltage change pattern that represents a feature of a vehicle. The number of sampling (corresponding to a specific number in FIG. 3) is not limited to three times and can be set to any number.

The control unit 101 detects a drastic voltage drop (falling) larger than a specific degree, among detected voltage levels, that occurs due to a load applied to a battery at the start of a cell motor. In FIG. 11, a signal portion 1104 corresponds a falling portion of the signal 1101. The control unit 101 determines that a cell motor starts at a moment at which the degree of voltage drop per unit of time is larger than a specific degree, for example.

A starting point 1105 of falling of the signal 1101 is set to a border between the first and second periods 201 and 202. Then, in the same way as described above, the control unit 101 obtains the border between the first and second periods 201 and 202 for each of the signals 1102 and 1103.

Figure 12:
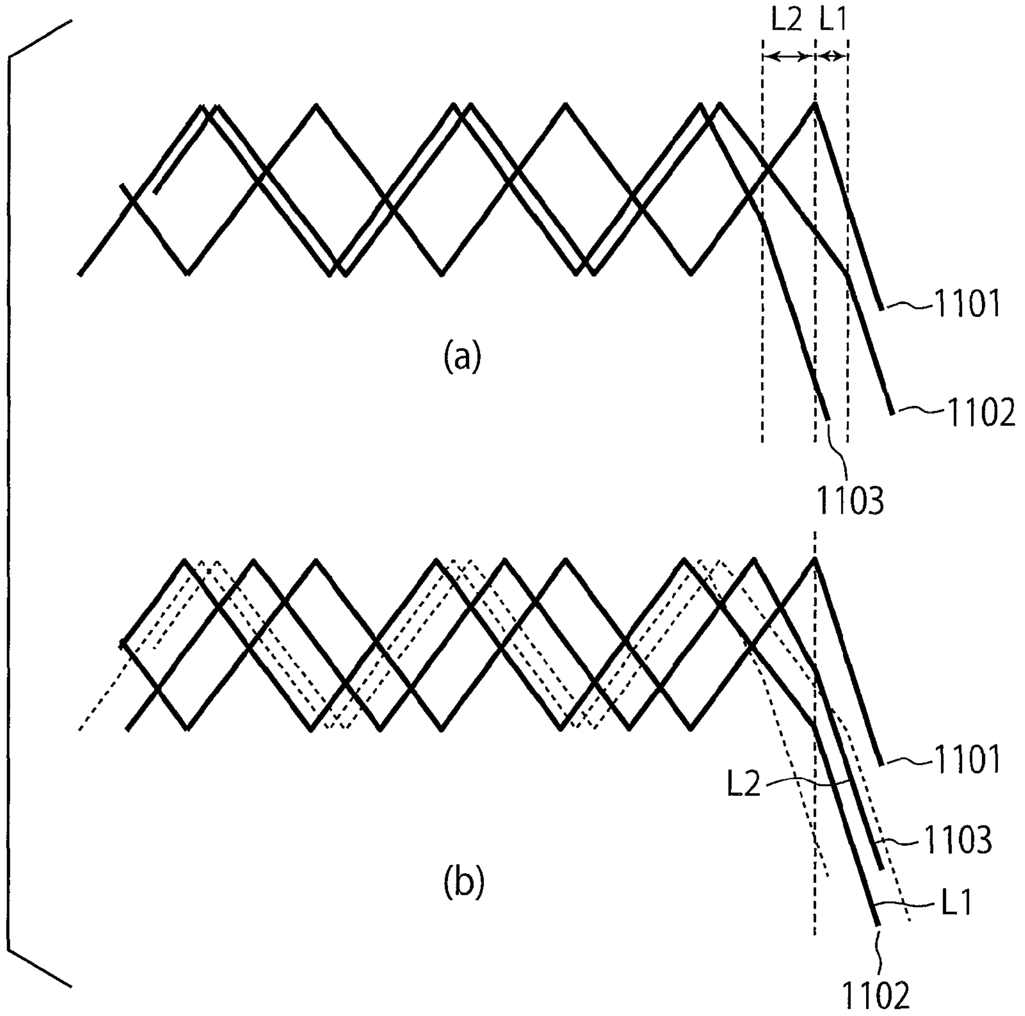
FIG. 12 is a view showing an example of signals that indicate the change in voltage level, with (a) showing an enlarged view of signals and (b) showing the shift of signals, in the second embodiment according to the present invention.

Through this process, there may be a case where rising moments are deviated from each other for the signals 1101 to 1103, as shown in (a) of FIG. 12. Shown in (a) of FIG. 12 is that the signal 1102 is delayed from the signal 1101 by the duration corresponding to a distance L1 and the signal 1103 advances with respect to the signal 1101 by the duration corresponding to a distance L2.

In this case, as shown in (b) of FIG. 12, the control unit 101 shifts the signal 1102 to the left so that the signal 1102 advances by the time corresponding to the distance L1 and shifts the signal 1103 to the right so that the signal 1103 is delayed by the duration corresponding to the distance L2.

Figure 13:
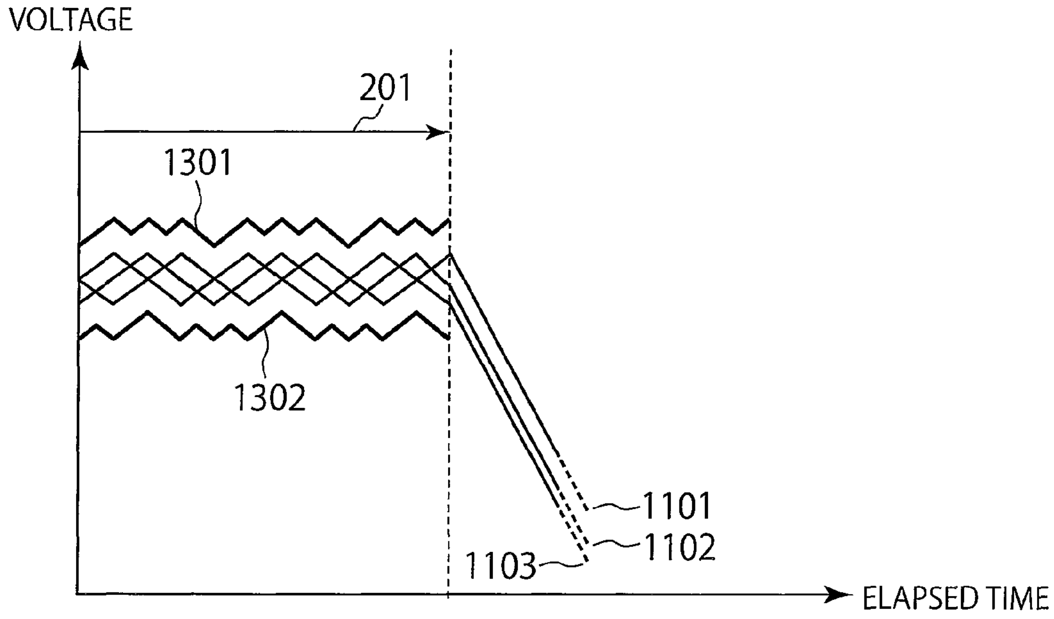
FIG. 13 is a view showing a voltage-change pattern in the first period, in the second embodiment according to the present invention.

Then, as shown in FIG. 13, the control unit 101 adds a specific level (such as 50 millivolts) to the maximum level of the signals 1101, 1102 and 1103 to generate a line 1301 indicating a maximum threshold level. Moreover, the control unit 101 subtracts a specific level (such as 50 millivolts) from the minimum level of the signals 1101, 1102 and 1103 to generate a line 1302 indicating a minimum threshold level. The lines 1301 and 1302 obtained as described above are set as a voltage change pattern for the first period 201.

Figure 14:
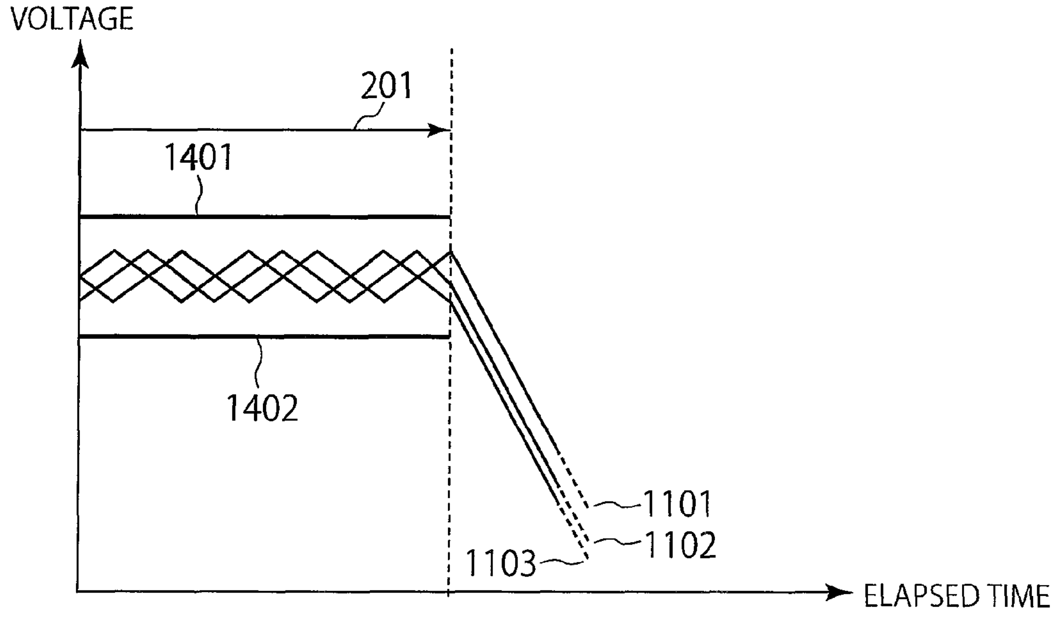
FIG. 14 is a view showing a voltage-change pattern in the first period, in the second embodiment according to the present invention.

Different from the method described above with respect to FIG. 13, as shown in FIG. 14, the control unit 101 may add a specific level (such as 50 millivolts) to the local maximum of each of the signals 1101, 1102 and 1103 to generate a straight line 1401 indicating a maximum threshold level. Moreover, the control unit 101 may subtract a specific level (such as 50 millivolts) from the local minimum of each of the signals 1101, 1102 and 1103 to generate a straight line 1402 indicating a minimum threshold level. However, there may be a case where the levels obtained by adding a specific level to the local maximum of each of the signals 1101, 1102 and 1103 do not lie on the same straight line. In this case, the control unit 101 obtains a regression line through the least square method to generate the line 1401 indicating the maximum threshold level.

Moreover, there may be a case where the levels obtained by subtracting a specific level from the local minimum of each of the signals 1101, 1102 and 1103 do not lie on the same straight line. In this case, the control unit 101 also obtains a regression line through the least square method to generate the line 1402 indicating the minimum threshold level.

(Voltage-Change Pattern Acquisition in Second Period)

Figure 15:
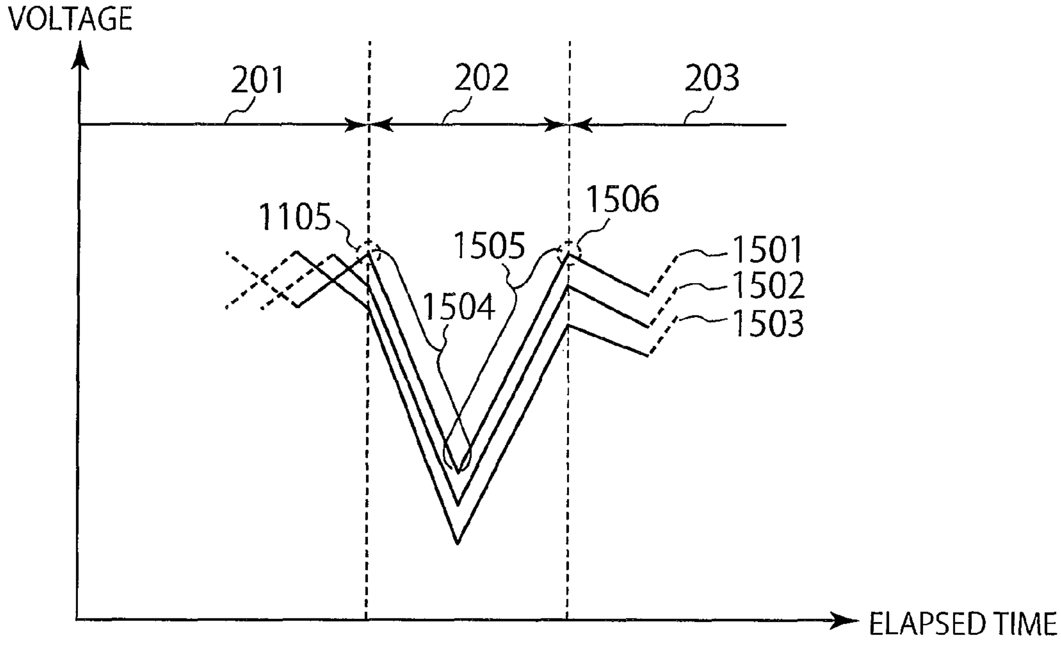
FIG. 15 is a view showing an example of signals that indicate the change in voltage level detected in a second period, in the second embodiment according to the present invention.

FIG. 15 shows a typical example of the change in voltage level in the second period 202. Shown in FIG. 15 are signals 1501, 1502 and 1503 that indicate results of detection of voltage levels for three times.

On detection of a signal portion 1504 of the signal 1501, that indicates a drastic voltage drop (falling), the control unit

101 obtains a starting point 1105 of falling of the signal portion 1504 and sets it to a border between the first and second periods 201 and 202.

Then, on detection of a signal portion 1505 that indicates a drastic voltage increase (rising) that follows the falling, the control unit 101 obtains an end point 1106 of rising of the signal portion 1505 and sets it to the border between the second and third periods 202 and 203. Accordingly, the period from the starting point 1105 to the end point 1106 becomes the second period 202.

In the same way as discussed above, the control unit 101 obtains the border between the first and second periods 201 and 202, and the border between the second and third periods 202 and 203 for the signals 1502 and 1503.

Moreover, as described with respect to the voltage change pattern for the first period, if the falling or rising of the signals 1501, 1502 and 1503 are deviated from one another, the control unit 101 shifts any of the signals to the left or right so that at least either the rising points or the falling points meet one another among the signals.

Figure 16:
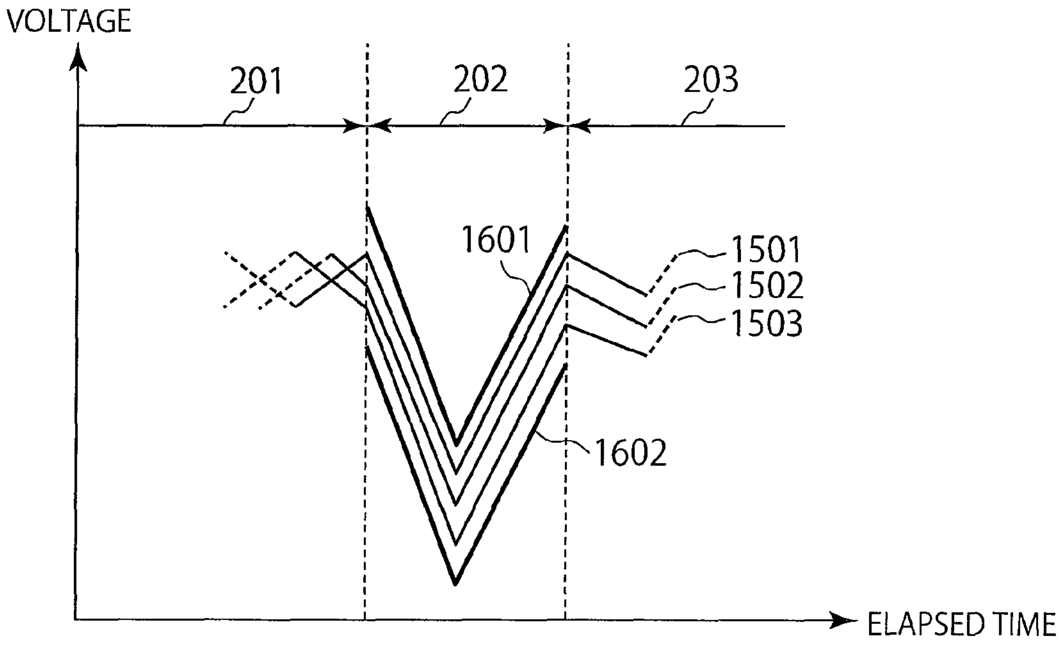
FIG. 16 is a view showing a voltage-change pattern in the second period, in the second embodiment according to the present invention.

Then, as shown in FIG. 16, the control unit 101 adds a specific level (such as 50 millivolts) to the maximum level of the signals 1501, 1502 and 1503 to generate a line 1601 indicating a maximum threshold level. Moreover, the control unit 101 subtracts a specific level (such as 50 millivolts) from the minimum level of the signals 1501, 1502 and 1503 to generate a line 1602 indicating a minimum threshold level. The lines 1601 and 1602 obtained as described above are set as a voltage change pattern for the second period 202.

(Voltage-Change Pattern Acquisition in Third Period)

Figure 17:
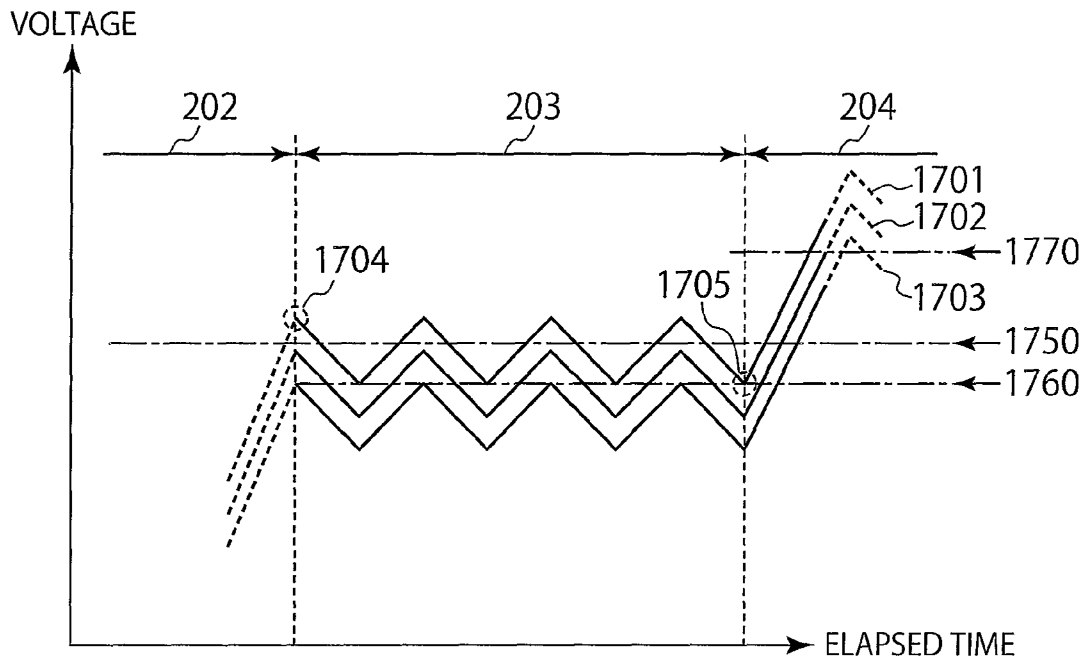
FIG. 17 is a view showing an example of signals that indicate the change in voltage level detected in a third period, in the second embodiment according to the present invention.

FIG. 17 shows a typical example of the change in voltage level in the third period 203. Shown in FIG. 17 are signals 1701, 1702 and 1703 that indicate results of detection of voltage levels for three times.

On detection of a signal portion of the signal 1701, that indicates a drastic voltage drop (falling), the control unit 101 obtains a starting point of falling of the signal portion and sets it to a border between the first and second periods 201 and 202.

Then, on detection of a signal portion that indicates a drastic voltage increase (rising) that follows the falling, the control unit 101 obtains an end point 1704 of rising of the signal portion and sets it to the border between the second and third periods 202 and 203.

Moreover, the control unit 101 sets a specific duration starting at the end point 1704 of rising to the third period 203. The specific duration is set to any length of time. In FIG. 17, a point 1705 is set to the end of the second period 203. Accordingly, the period from the points 1704 to 1705 becomes the third period 203.

In the same way as discussed above, the control unit 101 obtains the border between the first and second periods 201 and 202, and the border between the second and third periods 202 and 203 for the signals 1702 and 1703.

The control unit 101 may obtain the end point of the third period 203 using a detected voltage level itself. In detail, there is a tendency that voltage levels in the third period 203 during which a cell motor is rotating are lower than those in the first period 201 during which an engine is not operating. Moreover, there is a tendency that voltage levels in the fourth period 204 during which an engine is stably rotating are higher than those in the first period 201 during which an engine is not operating. In other words, in FIG. 17, there is a tendency that a center level 1760 of the voltage levels in the third period 203 is lower than a center level 1750 of the voltage levels in the first period 201. Moreover, in FIG. 17, there is a tendency that a center level 1770 of the voltage levels in the fourth period 204 is higher than the center level 1750 of the voltage levels in the first period 201. The center level is typically a median level. Another tendency is that the voltage level varies periodically in each of the third and fourth periods 203 and 204.

In view of the tendencies discussed above, the control unit 101 detects the rising of a voltage level at the transition from the third to fourth periods 203 to 204 and sets the rising to the border between the periods 203 to 204. For example, the control unit 101 may calculate a median level of the voltage levels in the first period 201 and set a moment at which a detected voltage level is higher than the median level to the border between the third and fourth periods 203 to 204.

Moreover, as described with respect to the voltage change pattern for the first period 201, if the falling or rising of the signals 1701, 1702 and 1703 are deviated from one other, the control unit 101 shifts any of the signals to the left or right so that at least either the rising points or the falling points meet one other among the signals.

Figure 18:
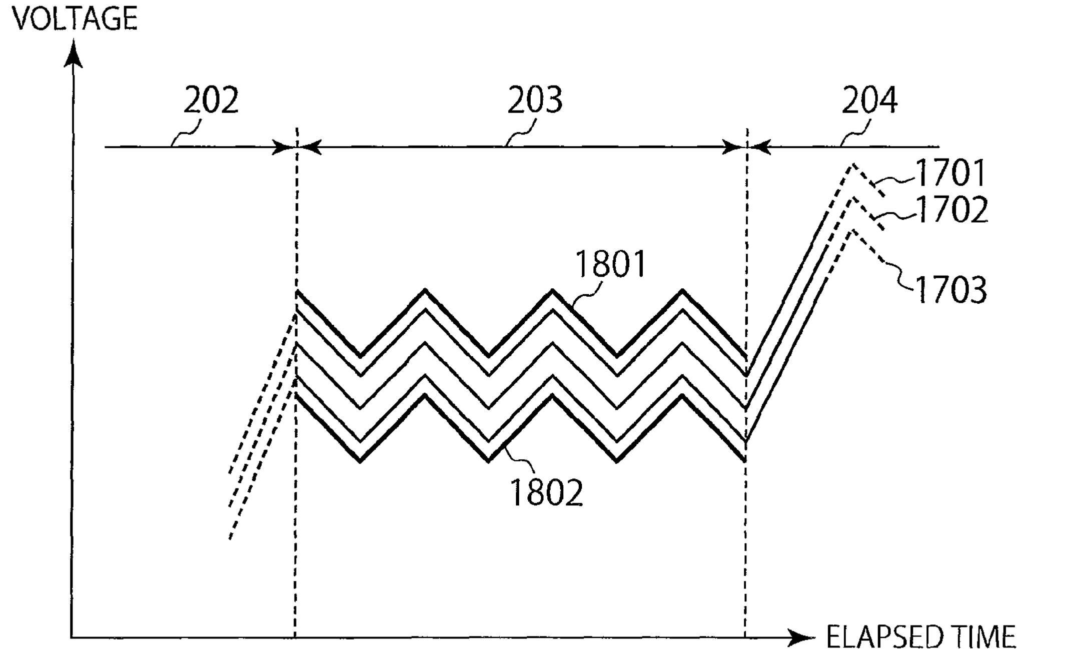
FIG. 18 is a view showing a voltage-change pattern in the third period, in the second embodiment according to the present invention.

Then, as shown in FIG. 18, the control unit 101 adds a specific level (such as 50 millivolts) to the maximum level of the signals 1701, 1702 and 1703 to generate a line 1801 indicating a maximum threshold level. Moreover, the control unit 101 subtracts a specific level (such as 50 millivolts) from the minimum level of the signals 1701, 1702 and 1703 to generate a line 1802 indicating a minimum threshold level. The lines 1801 and 1802 obtained as described above are set as a voltage change pattern for the third period 203.

(Voltage-Change Pattern Acquisition in Fourth Period)

Figure 19:
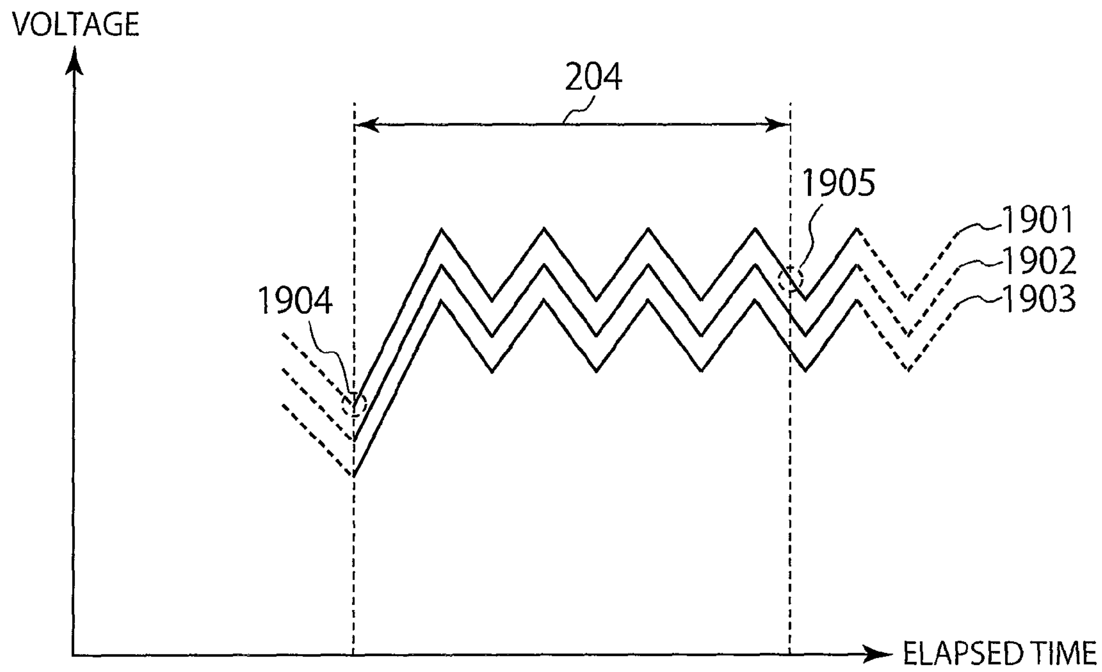
FIG. 19 is a view showing an example of signals that indicate the change in voltage level detected in a fourth period, in the second embodiment according to the present invention.

FIG. 19 shows a typical example of the change in voltage level in the fourth period 204. Shown in FIG. 19 are signals 1901, 1902 and 1903 that indicate results of detection of voltage levels for three times.

On detection of a signal portion of the signal 1901, that indicates a drastic voltage drop (falling), the control unit 101 obtains a starting point of falling of the signal portion and sets it to the border between the first and second periods 201 and 202.

Then, on detection of a signal portion that indicates a drastic voltage increase (rising) that follows the falling, the control unit 101 obtains an end point of rising of the signal portion and sets it to the border between the second and third periods 202 and 203, in the same way as described above.

Moreover, the control unit 101 sets a specific duration starting at the end point of rising to the third period 203. Or the control unit 101 detects the rising of a voltage level in obtaining the border between the third and fourth periods 203 and 204.

Furthermore, the control unit 101 sets a signal portion of a specific duration starting at the moment at which a cell motor stops rotation, to the fourth period 204. The specific duration can be set to any length of time. In FIG. 19, points 1904 and 1905 are set to the starting and end points of the fourth period 204, respectively. Accordingly, the period from the points 1904 to 1905 becomes the fourth period 204.

In the same way as discussed above, the control unit 101 obtains the border between the first and second periods 201 and 202, and the border between the second and third periods 202 and 203 for the signals 1902 and 1903.

Moreover, as described with respect to the voltage change pattern for the first period, if the falling or rising of the signals 1901, 1902 and 1903 are deviated from one other, the control unit 101 shifts any of the signals to the left or right so that at least either the rising points or the falling points meet one other among the signals.

Figure 20:
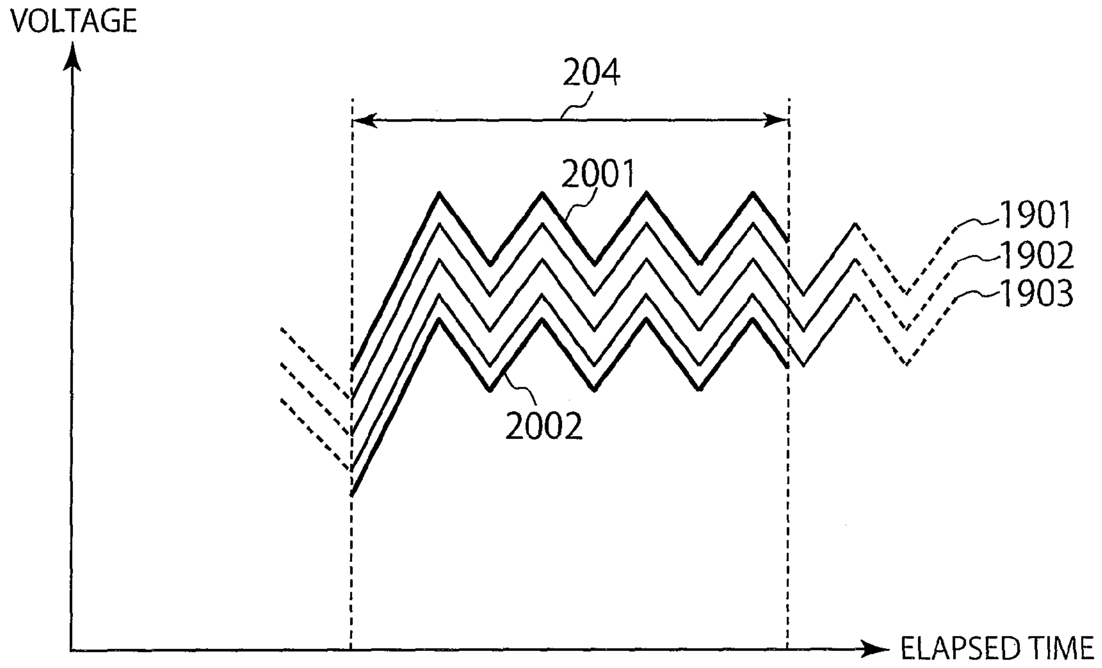
FIG. 20 shows a voltage-change pattern in the fourth period, in the second embodiment according to the present invention.

Then, as shown in FIG. 20, the control unit 101 adds a specific level (such as 50 millivolts) to the maximum level of the signals 1901, 1902 and 1903 to generate a line 2001 indicating a maximum threshold level. Moreover, the control unit 101 subtracts a specific level (such as 50 millivolts) from the minimum level of the signals 1901, 1902 and 1903 to generate a line 2002 indicating a minimum threshold level. The lines 2001 and 2002 obtained as described above are set as a voltage change pattern for the fourth period 204.

As described above, in the second embodiment, the control unit 101 can acquire voltage change patterns separately for the first to fourth periods 201 to 204. Moreover, in the second embodiment, the control unit 101 can determine whether an in-vehicle apparatus has been installed in a permissible manner or in the right vehicle based on the voltage change patterns acquired separately. Therefore, the in-vehicle apparatus control system 100 according to the second embodiment can prevent the use of an in-vehicle apparatus with no permission or authorization.

Generally, an engine is started with an ignition button or key to rotate a cell motor, etc. In the case of turning an ignition key to rotate a cell motor, there may be a variation in time to rotate a cell motor. Moreover, it may be easy or difficult to start an engine, depending on the season.

According to the second embodiment, however, the voltage change pattern is identified for each of the four periods 201 to 204 in order to avoid misidentification due to the variation in rotating time of a cell motor, the season, etc., thus achieving high accuracy in the processing.

(Third Embodiment)

In the first and second embodiments, a voltage change pattern is acquired for each of the first period 201 (in which an engine is not operating), the second period 202 (in which a user inserts an ignition key into an ignition cylinder and turns it to start a cell motor to rotate for the start of an engine, the third period 203 (in which a cell motor is rotating), and the fourth period 204 (in which an engine is rotating).

However, it may also be performed to acquire a voltage change pattern for any one of the first to fourth periods 201 to 204 or for at least two of these periods, store the acquired pattern in the storage unit 104, and compare it with a detected change in voltage level.

It is, for example, expected that the difference in voltage change pattern among vehicles in the first and second periods 201 and 202 is comparatively smaller than that in the third and fourth periods 203 and 204.

Therefore, in the third embodiment, the control unit 101 acquires voltage change patterns in the third and fourth periods 203 and 204 only, and stores the acquired patterns in the storage unit 104. Then, the control unit 101 compares the stored voltage change patterns for the third and fourth periods 203 and 204, and detected change in voltage level to determine whether an in-vehicle apparatus has been installed in a permissible manner or in the right vehicle.

Moreover, the control unit 101 may acquire voltage change patterns in all periods in the initial voltage-change pattern acquisition process, followed by updating the voltage change pattern (step S507 in FIG. 5), and then acquire voltage change patterns only in a period for which the voltage change pattern has been updated. These steps provide high accuracy to the updated data.

Furthermore, it may be performed that, when any parts of a vehicle is replaced with a new one, the control unit 101 performs the voltage-change pattern acquisition process only for the period in which a voltage level is easily varied due to the replacement of the parts. For example, the voltage-change pattern acquisition process may be performed only for the third period 203 when a cell motor has been replaced with a new one.

(Fourth Embodiment)

In the above embodiments, a voltage change pattern is acquired and/or identified for each of the first period 201 (in which an engine is not operating), the second period 202 (in which a user inserts an ignition key into an ignition cylinder to turn it to start a cell motor to rotate for the start an engine, the third period 203 (in which a cell motor is rotating), and the fourth period 204 (in which an engine is rotating). However, there are several variations in defining the periods.

Figure 21:
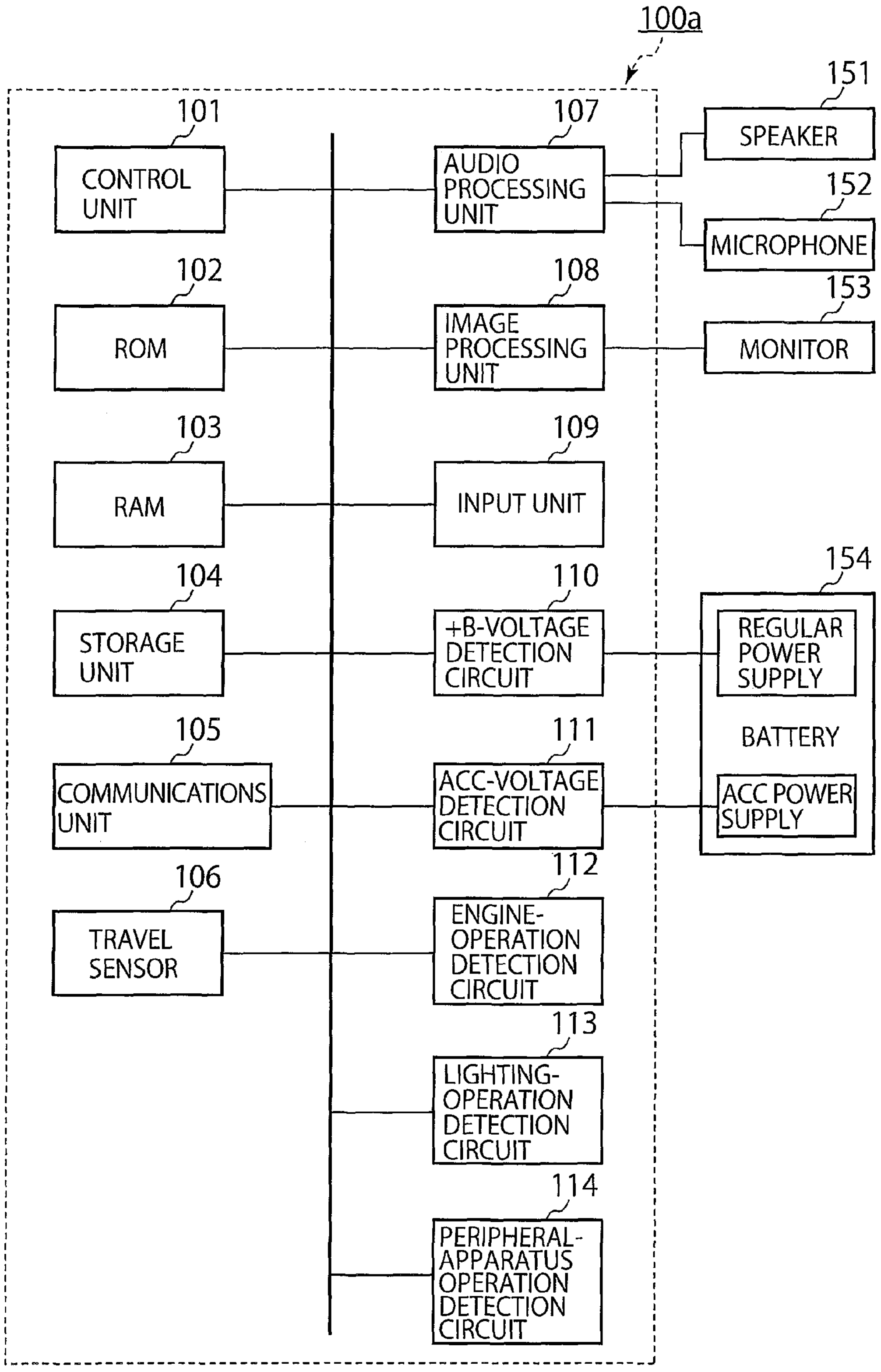
FIG. 21 is a view showing a hardware configuration of an in-vehicle apparatus control system in a fourth embodiment according to the present invention.

FIG. 21 is a view showing a hardware configuration of an in-vehicle apparatus control system 100*a* in a fourth embodiment. In FIG. 21, the same reference numerals are given to the elements the same as or analogous to those shown in FIG. 1.

In FIG. 21, the in-vehicle apparatus control system 100*a* is provided with a lighting-operation detection circuit 113 and a peripheral-apparatus operation detection circuit 114, in addition to those shown in FIG. 1.

The lighting-operation detection circuit 113 detects whether vehicle lights are on, such as vehicle headlights, stop lamps, winker lamps, and interior lights. In addition, the lighting-operation detection circuit 113 detects which mode is selected for vehicle lights, such as a high beam and a low beam for headlights. A result of detection at the lighting-operation detection circuit 113 is input to the control unit 101.

The peripheral-apparatus operation detection circuit 114 detects whether a peripheral apparatus installed in a vehicle, such as audio equipment and an air conditioner, is operating. In addition, the peripheral-apparatus operation detection circuit 114 detects which mode is selected for a peripheral apparatus, such as high and low in operation, and temperature setting for an air conditioner. A result of the detection at the peripheral-apparatus operation detection circuit 114 is input to the control unit 101.

When notified of the turn-on of headlights (or another type of vehicle lights), the control unit 101 starts to detect a voltage level at the +B-detection circuit 110 or the ACC-voltage detection circuit 111. While the headlights are on, the control unit 101 acquires detected voltage levels at the +B-detection circuit 110 or the ACC-voltage detection circuit 111 for a specific period until a given time elapses and stores the detected voltage levels in the storage unit 104.

When a specific number or more of detected voltage levels have been stored in the storage unit 104, the control unit 101 performs the voltage-change pattern acquisition process described above to acquire a voltage change pattern for the period in which the headlights were on and stores the pattern in the storage unit 104.

When the headlights are turned on again, the control unit 101 performs the voltage-change pattern identification process described above, using the voltage change pattern stored in the storage unit 104. In detail, when notified of the turn-on again of the headlights by the lighting-operation detection circuit 113, the control unit 101 compares the voltage change pattern obtained in advance for the period in which the headlights were on and stored in the storage unit 104 and the change in voltage level that is detected while the headlights are on now. If the stored voltage change pattern and detected change in voltage level match each other, the control unit 101 operates an in-vehicle apparatus in normal operation. On the other hand, if the stored voltage change pattern and detected change in voltage level do not match each other, the control unit 101 controls the in-vehicle apparatus so that a user cannot use the apparatus.

Moreover, when notified of the use of audio equipment (or anther type of equipment, such as a CD/DVD player, a radio, a TV, a transceiver, an air conditioner, and a cigar socket), the control unit 101 starts to detect a voltage level at the +B-detection circuit 110 or the ACC-voltage detection circuit 111. While the audio equipment is on, the control unit 101 acquires detected voltage levels at the +B-detection circuit 110 or the ACC-voltage detection circuit 111 for a specific period until a given time elapses and stores the detected voltage levels in the storage unit 104.

When a specific number or more of detected voltage levels have been stored in the storage unit 104, the control unit 101 performs the voltage-change pattern acquisition process described above to acquire a voltage change pattern for the period in which the audio equipment was used and stores the pattern in the storage unit 104.

When the audio equipment is used again, the control unit 101 performs the voltage-change pattern identification process described above, using the voltage change pattern stored in the storage unit 104. In detail, when notified of the use again of the audio equipment by the peripheral-apparatus operation detection circuit 114, the control unit 101 compares the voltage change pattern obtained in advance for the period in which the audio equipment was used and stored in the storage unit 104, and the change in voltage level that is detected while the audio equipment is used now. If the stored voltage change pattern and detected change in voltage level match each other, the control unit 101 operates an in-vehicle apparatus in normal operation. On the other hand, if the stored voltage change pattern and detected change in voltage level do not match each other, the control unit 101 controls the in-vehicle apparatus so that a user cannot use the apparatus.

The in-vehicle apparatus control system 100*a* may be provided with both of or either of the lighting-operation detection circuit 113 and the peripheral-apparatus operation detection circuit 114.

The control unit 101 may perform the voltage-change pattern acquisition and identification processes using a result of detection at the lighting-operation detection circuit 113, in addition to the processes for the first to fourth periods 201 to 204 (for all of or some of the periods).

Furthermore, the control unit 101 may perform the voltage-change pattern acquisition and identification processes using a result of detection at the peripheral-apparatus operation detection circuit 114, in addition to the processes for the first to fourth periods 201 to 204 (for all of or some of the periods).

(Fifth Embodiment)

In a fifth embodiment, an in-vehicle apparatus control system 100*b* detects the vibration of a vehicle and performs vibration-change pattern acquisition and identification processes based on detected vibration.

Figure 22:
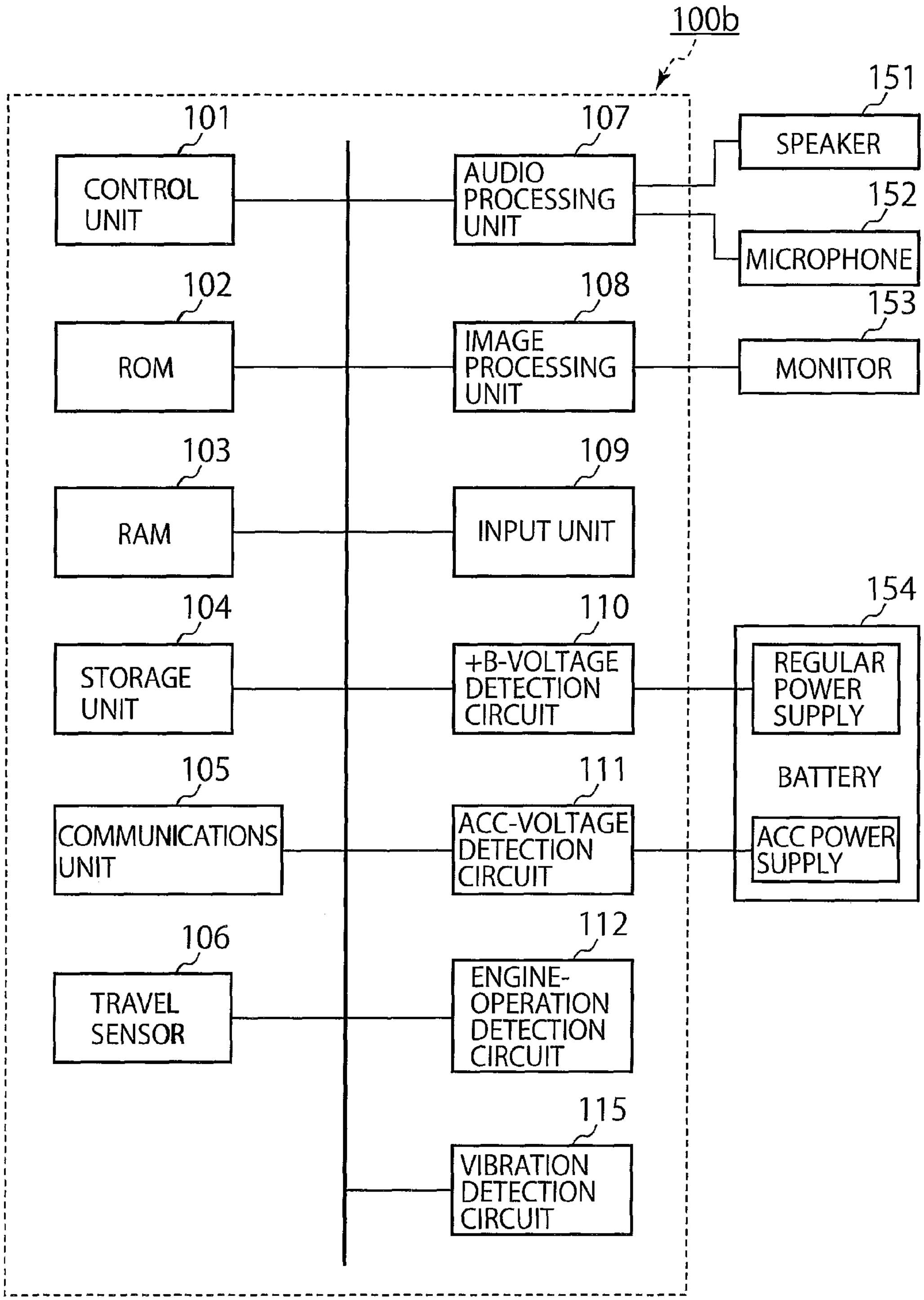
FIG. 22 is a view showing a hardware configuration of an in-vehicle apparatus control system in a fifth embodiment according to the present invention.

FIG. 22 is a view showing a hardware configuration of the in-vehicle apparatus control system 100*b* in the fifth embodiment. In FIG. 22, the same reference numerals are given to the elements the same as or analogous to those shown in FIG. 1.

In FIG. 22, the in-vehicle apparatus control system 100*b* is provided with a vibration detection circuit 115, in addition to those shown in FIG. 1.

The control unit 101 performs vibration-change pattern acquisition and identification processes using vibration levels detected at the vibration detection circuit 115, in the same way as the voltage-change pattern acquisition and identification processes using voltage levels detected at the +B-voltage detection circuit 110 or the ACC-voltage detection circuit 111.

The vibration detection circuit 115 detects a vibration or jolt, with its level, of a vehicle equipped with an in-vehicle apparatus and input them to the control unit 101. The vibration detection timing can be set to any timing. For example, the vibration detection starts when a specific time elapses after an engine starts.

Figure 23:
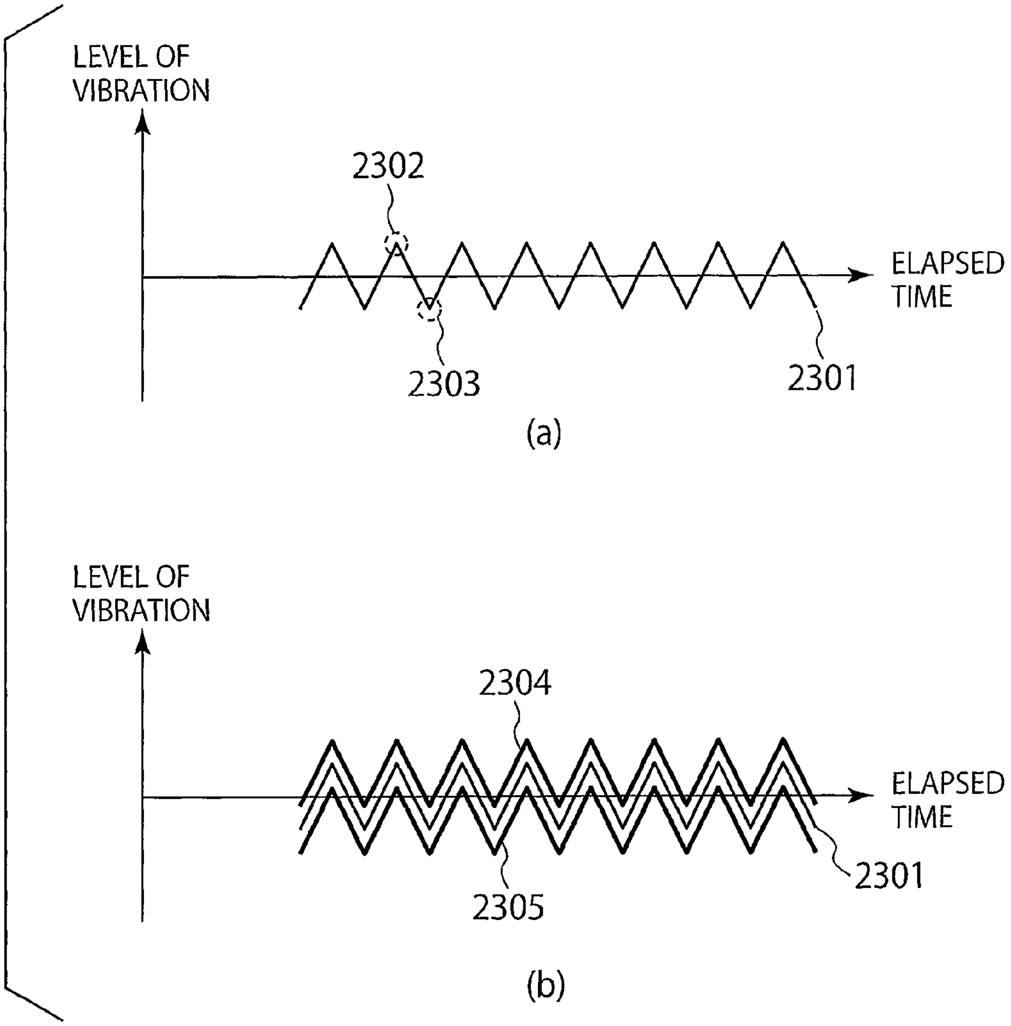
FIG. 23 is a view of vibration, with (a) showing an example of detected vibration and (b) showing the maximum and minimum levels of the vibration.

Shown in (a) of FIG. 23 is an example of change in vibration detected by the vibration detection circuit 115. A signal 2301 indicates a typical vibration wave having a specific amplitude and cycle.

The control unit 101 stores a specific number or more of signals indicating vibrations detected by the vibration detection circuit 115. When the number of stored data reaches the specific number, the control unit 101 shifts the signals along the axis of elapsed time so that either or both of local maximums or local minimums match one another among the signals.

Then, as shown in (b) of FIG. 23, the control unit 101 generates a maximum-level line 2304 obtained by adding a specific level to the maximum levels among those of the specific number of signals and connecting the specific-level-added maximum levels to one another. Moreover, the control unit 101 generates a minimum-level line 2305 obtained by subtracting a specific level from the minimum levels among those of the specific number of signals and connecting the specific-level-subtracted minimum levels to one another. Then, the control unit 101 combines the lines 2304 and 2305 to generate a vibration change pattern having an allowable range from the minimum to maximum levels and stores it in the storage unit 104 (a vibration-change pattern acquisition process).

When the vibration detection circuit 115 detects vibrations, the control unit 101 compares the detection vibrations and the vibration change pattern stored in the storage unit 104 to determine whether the detection vibrations are within the allowable range (a vibration-change pattern identification process). If the detected vibrations are within the allowable range, the control unit 101 operates an in-vehicle apparatus in normal operation. On the other hand, if the detected vibrations are out of the allowable range, the control unit 101 does not operate the in-vehicle apparatus in normal operation.

The fifth embodiment can be combined with any of the embodiments described above. For example, the control unit 101 may perform the voltage-change pattern acquisition and identification processes described above and the voltage-change pattern acquisition and identification processes in this embodiment. If the detected voltage levels are within the allowable range and also the detected vibrations are within the allowable range, the control unit 101 operates an in-vehicle apparatus in normal operation. On the other hand, if at least either of the detected voltage and the detected vibration is out of the allowable range, the control unit 101 does not operate the in-vehicle apparatus in normal operation.

With the combination of the embodiments described above, it is more accurately determined whether an in-vehicle apparatus has been installed in a permissible manner or installed in the right vehicle.

(Sixth Embodiment)

In this embodiment, the engine-operation detection circuit 112 (FIG. 1) detects an engine speed, in addition to the rotation of a cell motor for starting an engine, the rotation of the engine, and the stop of the engine. Then, the in-vehicle apparatus control system 100 determines the period for the voltage-change pattern acquisition and identification processes using the difference in engine speed.

In the fourth period 204 for which an engine is rotating, the control unit 101 acquires an engine speed from the engine-operation detection circuit 112 and also a voltage level from the B-voltage detection circuit 110 or ACC-voltage detection circuit 111.

Figures 24, 25:
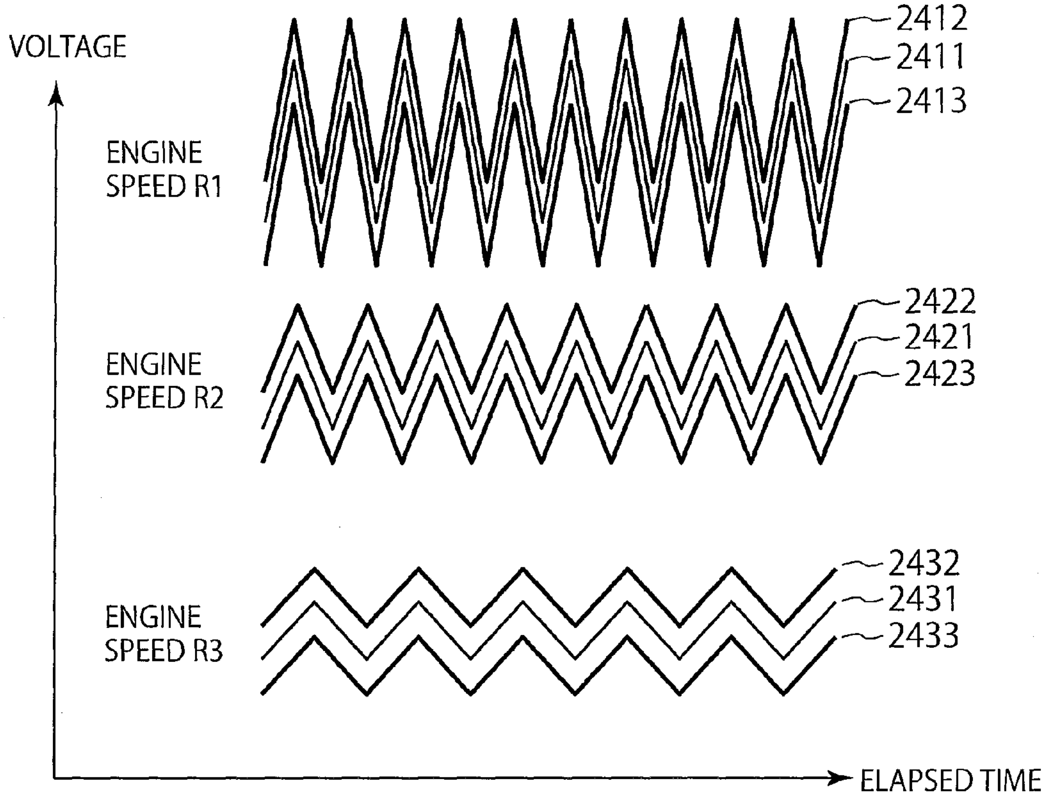
FIG. 24 is a view showing voltage-change patterns depending on engine speed in a sixth embodiment according to the present invention.
FIG. 25 is a view showing a modification to the sixth embodiment, depending on several regions of the engine speed.

For example, as shown in FIG. 24, the control unit 101 acquires a signal 2411 that indicates an engine speed of R1, a signal 2421 that indicates an engine speed of R2 (R2<R1), and a signal 2431 that indicates an engine speed of R3 (R3<R2).

The control unit 101 sets a maximum threshold level to the level obtained by adding a specific level (for example, 50 millivolts) to the maximum levels on each of the signals 2411 to 2413. Moreover, the control unit 101 sets a minimum threshold level to the level obtained by subtracting a specific level (for example, 50 millivolts) from the minimum levels on each of the signals 2411 to 2413.

In FIG. 24, lines 2412 and 2413 that connect the maximum and minimum threshold levels, respectively, constitute a voltage change pattern at the engine speed of R1. Lines 2422 and 2423 that connect the maximum and minimum threshold-levels, respectively, constitute a voltage change pattern at the engine speed of R2. Lines 2432 and 2433 that connect the maximum and minimum threshold levels, respectively, constitute a voltage change pattern at the engine speed of R3.

The control unit 101 stores the acquired voltage change patterns in the storage unit 104, associated with the engine speeds R1 to R3.

Not only acquiring voltage change patterns associated with particular engine speeds R1 to R3, the control unit 101 may acquire a voltage change pattern for each of several regions of the engine speed, such as shown in FIG. 25.

Moreover, the control unit 101 may acquire voltage change patterns depending on the type of gear, such as a low gear, a second gear, etc., instead of the engine speed.

The sixth embodiment is based on a presumption that the voltage change pattern while an engine is rotating is affected by the power generated by an alternator and the effect is relatively large. And, there is a tendency that the power generated by an alternator varies, depending on the engine speed. In view of such presumption and tendency, the sixth embodiment achieves more accurate determination of whether an in-vehicle apparatus has been installed in a permissible manner or installed in the right vehicle, using various voltage change patterns depending on the engine speed.

(Seventh Embodiment)

In this embodiment, the in-vehicle apparatus control system 100 updates a voltage change pattern with the prediction of change in the maximum and minimum threshold levels that occurs due to the aged degradation of a battery.

In the voltage-change pattern acquisition process described above, the control unit 101 stores acquired voltage change patterns and the date and time at which the patterns are acquired, in the storage unit 104.

Then, the control unit 101 compares the current date and time measured by a real-time clock installed in the in-vehicle apparatus control system 100 and the date and time of the storage unit 104, stored as associated with voltage change patterns. As a result of comparison, if it is determined that a specific time has elapsed after the storage of the voltage change patterns, the control unit 101 updates the stored voltage change patterns by shifting the patterns in a direction of a lower voltage level. The voltage change patterns stored in the storage unit 104 are automatically updated whenever a specific time elapses.

The level to be shifted, or an offset value can be set to any value. The offset value is preferably determined based on experiments by a battery developer.

When a battery is replaced with a new one, there is a possibility that voltage change patterns are shifted in a direction of an upper voltage level. In this case, the control unit 101 may recognize the replacement of a battery when the +B-voltage detection circuit 110 detects no voltage level and update the voltage change patterns stored in the storage unit 104.

When a battery is replaced with a new one, there is a possibility that voltage change patterns change vary much. In this case, the control unit 101 may recognize the replacement of a battery when a user permitted or authorized for resetting the in-vehicle apparatus control system 100 enters a reset command and restart the voltage-change pattern acquisition process from the beginning.

(Eighth Embodiment)

This embodiment is based on the difference in the capacity of batteries depending on the size of vehicles, such as, a large vehicle, a medium-size vehicle, and a small vehicle.

In general, the capacity of batteries used for large vehicles, such as a truck, and that for medium-size and small vehicles are mostly about 24 volts and 12 volts, respectively.

Therefore, in the eighth embodiment, the control unit 101 determines that an in-vehicle apparatus has been installed with no permission or authorization if the median level of a voltage change pattern stored in the storage unit 104 is 12 volts but a voltage level detected in the voltage change pattern identification process is 24 volts, and vice versa. Then, the control unit 101 controls the in-vehicle apparatus so that the in-vehicle apparatus cannot operate in normal operation. The median level may be set to an average level of the local maximum and minimum levels or an average level of the average of several local maximum levels and the average of several local minimum levels, in the change of voltage level.

It is preferable for an in-vehicle apparatus, such as an ETC system, to be protected from the unauthorized removal from the right vehicle and the unauthorized installation into another vehicle, because of difference in charged fee depending on the type of vehicles. In such case, according to the eighth embodiment, the unauthorized installation of an in-vehicle apparatus can be prevented beforehand, by controlling the operation of the in-vehicle apparatus based on the determination of the capacity of batteries depending on the size of vehicles.

The capacity of batteries of 12 and 24 volts are just an example and which may be set to any values (a first value and a second value).

(Ninth Embodiment)

The level of the remaining battery capacity may be temporality lowered when a driver forgets to turn off vehicle lights, in addition to the effects of battery degradation (the seventh embodiment) and of the type of vehicles (eighth embodiment).

When a driver forgets to turn off vehicle lights or electric equipment to be used with power through a cigar socket, there is a possibility that the level of the remaining battery capacity is lowered, hence a voltage level detected in the first period 201 (during which an engine is not operation) is out of the allowable range with maximum and minimum threshold levels.

Therefore, in a ninth embodiment, the control unit 101 determines that a user forgets to turn off the power of electric equipment or the like if the number of detected points in the first period 210 and out of the allowable range is a specific number or more. Then, the control unit 101 excludes the first period 210 from the voltage-change pattern identification process and performs the process for the second, third and fourth periods 202, 203 and 304. Or the control unit 101 excludes the first period 210 from the voltage-change pattern identification process if all of the detected points in the first period 210 are out of the allowable range and performs the process for the second, third and fourth periods 202, 203 and 304.

However, a lowered remaining battery capacity due to the fact that a user forgets to turn off the power of electric equipment may often recover when an engine rotates and then a battery is charged by the power generated by an alternator.

Therefore, in the ninth embodiment, the control unit 101 determines that a user forgets to turn off the power of electric equipment or the like if the number of detected points in the first period 210 and out of the allowable range is a specific number or more. The control unit 101 then excludes the first period 210 from the voltage-change pattern identification process. And, when an engine is restarted after the elapse of a specific period of rotation, the control unit 101 includes the first period 210 in the voltage-change pattern identification process.

The ninth embodiment is based on the presumption that the change in voltage level largely affected by a cell motor and an alternator in the second to fourth periods 202 to 204, hence the accuracy of the voltage-change pattern identification process is not lowered so much when performed for these periods, other than the first period 201.

In addition to the situation in which a user forgets to turn off the power of electric equipment, there is a possibility that a voltage level is lowered when detected at the time of engine stop after an engine has not been operated for a long time, hence the voltage level being out of the allowable range with the maximum and minimum thresh hold levels.

Therefore, in the ninth embodiment, the control unit 101 compares the day and time at which a significant falling (a large voltage drop) is detected in step S501 (FIG. 5) in the voltage-change pattern identification process and the day and time stored in the storage unit 104, as associated with voltage change patterns, when the difference in day and time is equal to or longer than a specific term; excludes the first period 201 from the voltage-change pattern identification process; and performs the identification process for the second to fourth periods 202 to 204.

The in-vehicle apparatus under control by the in-vehicle apparatus control system according to the present invention may be an automotive navigation system or the like, as described above. In the case of an automotive navigation system or the like, a user of the navigation system may want to remove the navigation system from his or her vehicle in which the navigation system has been installed and install it into another vehicle. In this case, the user can enter a reset command or a password and restart the voltage-change pattern acquisition process from the beginning so that he or she can use the automotive navigation system in the other vehicle. The reset command or password may be entered by depressing a set of buttons or keys on board of the in-vehicle apparatus control system, in a secret manner. Moreover, the pass word may be registered with a manufacturer of the automotive navigation system, for security reasons.

The present invention is not limited to the several embodiments described above and hence various changes and modifications, and the combination of any of the embodiments may be made in the invention without departing from the sprit and scope thereof.

A program for achieving all of or part of the functions of the in-vehicle apparatus control system in the embodiments described above may be installed in a computer-readable storage medium, such as a memory card, a CD-ROM, a DVD, and a MO (Magneto Optical Disk) and distributed. The storage medium can be installed in a computer to run the program to perform the functions or the process described above.

Moreover, a program for achieving all of or part of the functions of the in-vehicle apparatus control system in the embodiments described above may be installed in a disc apparatus or the like of a server on the Internet. The program can be carried by a carrier wave and downloaded to a computer via the Internet.

As described above in detail, the present invention can provide an in-vehicle apparatus control system, an in-vehicle apparatus control method, and an in-vehicle apparatus control program that can detect impermissible or unauthorized installation of an in-vehicle apparatus to prevent impermissible or unauthorized use of the apparatus with smaller adverse effects from the environment around a vehicle.

What is claimed is:

1. An in-vehicle apparatus control system for controlling an in-vehicle apparatus installed in a vehicle comprising:

a storage unit configured to store voltage-change pattern data, having a minimum threshold level and a maximum threshold level, that indicates change in voltage level, as associated with an elapse of time, the voltage levels being detected for each of a plurality of periods based on an operating condition of an engine of the vehicle at a time when the engine starts;

a voltage detection unit configured to detect voltage levels of a battery installed in the vehicle for the respective periods when the engine starts;

a determination unit configured to determine whether the voltage levels detected by the voltage detection unit for the respective periods are within an allowable range from the minimum threshold level to the maximum threshold level of the stored voltage-change pattern data; and a control unit configured to control the in-vehicle apparatus to operate in normal operation if it is determined that the detected voltage levels are within the allowable range from the minimum threshold level to the maximum threshold level of the stored voltage-change pattern data and to control the in-vehicle apparatus not to operate in the normal operation if it is determined that the detected voltage levels do not match the stored voltage-change pattern data, wherein the control unit acquires the maximum threshold level by adding a specific level to a maximum level of the detected voltage levels and obtains the minimum threshold level by subtracting a specific level from a minimum level of the detected voltage levels.

2. The in-vehicle apparatus control system according to claim 1, wherein the periods are a first period for which an engine is not operating, a second period that follows the first period, for which a cell motor of the vehicle starts to rotate, a third period that follows the second period, for which the cell motor is rotating, and a fourth period that follows the third period, for which the engine is rotating, and the control unit performs determination of whether voltage levels detected for at least one of the first to fourth periods match the stored voltage-change pattern data.

3. The in-vehicle apparatus control system according to claim 1, wherein the control unit acquires:

the minimum and maximum threshold levels by using the detected voltage levels and updates the stored voltage-change pattern data by using the minimum and maximum threshold levels.

4. The in-vehicle apparatus control system according to claim 3, wherein the storage unit stores a day and time at which the voltage-change pattern data is obtained, as associated with the voltage-change pattern data, and the control unit updates the stored voltage-change pattern data if a current day and time elapses from the stored day and time for a specific term or more.

5. The in-vehicle apparatus control system according to claim 2, wherein the determination unit excludes the first period from the determination if a specific number or more of voltage levels detected for the first period are out of an allowable range and included in the stored voltage-change pattern data and determines whether voltage levels detected for at least one of the second to fourth periods matches the stored voltage-change pattern data.

6. The in-vehicle apparatus control system according to claim 2, wherein the storage unit stores a day and time at which the voltage-change pattern data is stored, as associated with the stored voltage-change pattern data, and the determination unit excludes the first period from the determination if a day and time at which change in the detected voltage levels goes beyond a specific degree has elapsed for a specific term from the stored day and time, and determines whether voltage levels detected for at least one of the second to fourth periods match the stored voltage-change pattern data.

7. The in-vehicle apparatus control system according to claim 1, wherein the determination unit determines that the detected voltage levels match the stored voltage-change pattern data if a specific number or more of the detected voltage levels is included in the allowable range.

8. The in-vehicle apparatus control system according to claim 2, wherein the determination unit determines that the detected voltage levels match the stored voltage-change pattern data if a pattern of change in the detected voltage levels is similar to a pattern of the stored voltage-change pattern data.

9. The in-vehicle apparatus control system according to claim 1 further comprising a lighting-operation detection circuit for detecting whether a light of the vehicle is turned on, wherein the storage unit stores voltage-change pattern data obtained while the light is being turned on, as associated with the elapse of time, and the determination unit determines, when the light is turned on, whether the detected voltage levels match the stored voltage-change pattern data obtained while the light is being turned on.

10. The in-vehicle apparatus control system according to claim 1 further comprising a peripheral-apparatus operation detection circuit for detecting whether a peripheral apparatus of the vehicle is used, power being supplied to the peripheral apparatus from the battery, wherein the storage unit stores voltage-change pattern data obtained while the peripheral apparatus is being used, as associated with the elapse of time, and the determination unit determines, when the peripheral apparatus is used, whether the detected voltage levels match the stored voltage-change pattern data obtained while the peripheral apparatus is being used.

11. The in-vehicle apparatus control system according to claim 1 further comprising a vibration detection circuit for detecting vibration of the vehicle, wherein the storage unit stores vibration-change pattern data that indicates change in vibration, as associated with the elapse of time, the determination unit determines whether the detected vibration matches the stored vibration-change pattern data, and the control unit controls the in-vehicle apparatus to operate in normal operation only if it is determined that the detected voltage levels match the stored voltage-change pattern data and also it is determined that the detected vibration matches the stored vibration-change pattern data.

12. The in-vehicle apparatus control system according to claim 1 further comprising an engine-operation detection circuit for detecting an engine speed of the vehicle, wherein the storage unit stores the voltage-change pattern data as associated with the detected engine speed and the elapse of time, and the control unit controls the in-vehicle apparatus to operate in normal operation only if the detected voltage levels match the voltage-change pattern data stored as associated with the detected engine speed and the elapse of time, while the engine is rotating at the detected engine speed.

13. An in-vehicle apparatus control method for controlling an in-vehicle apparatus installed in a vehicle comprising the steps of:

storing voltage-change pattern data, having a minimum threshold level and a maximum threshold level, that indicates change in voltage level, as associated with an elapse of time, the voltage levels being detected for each of a plurality of periods based on an operating condition of an engine of the vehicle at a time when the engine starts;

detecting voltage levels of a battery installed in the vehicle for the respective periods when the engine starts;

determining whether the voltage levels detected for the respective periods are within an allowable range from the minimum threshold level to the maximum threshold level of the stored voltage-change pattern data; and controlling the in-vehicle apparatus to operate in normal operation if it is determined that the detected voltage levels are within the allowable range from the minimum threshold level to the maximum threshold level of the stored voltage-change pattern data and to control the in-vehicle apparatus not to operate in the normal operation if it is determined that the detected voltage levels do not match the stored voltage-change pattern data, the maximum threshold level being acquired by adding a specific level to a maximum level of the detected voltage levels and obtains the minimum threshold level by subtracting a specific level from a minimum level of the detected voltage levels.

14. An in-vehicle apparatus control program stored in a non-transitory computer readable device, for controlling an in-vehicle apparatus installed in a vehicle comprising:

a program code to store voltage-change pattern data, having a minimum threshold level and a maximum threshold level, that indicates change in voltage level, as associated with an elapse of time, the voltage levels being detected for each of a plurality of periods based on an operating condition of an engine of the vehicle at a time when the engine starts;

a program code to detect voltage levels of a battery installed in the vehicle for the respective periods when the engine starts;

a program code to determine whether the detected voltage levels are within an allowable range from the minimum threshold level to the maximum threshold level of the stored voltage-change pattern data; and a program code to control the in-vehicle apparatus to operate in normal operation if it is determined that the detected voltage levels are within the allowable range from the minimum threshold level to the maximum threshold level of the stored voltage-change pattern data and to control the in-vehicle apparatus not to operate in the normal operation if it is determined that the detected voltage levels do not match the stored voltage-change pattern data, the maximum threshold level being acquired by adding a specific level to a maximum level of the detected voltage levels and obtains the minimum threshold level by subtracting a specific level from a minimum level of the detected voltage levels.

* * * * *